United States Patent [19]
Maekawa et al.

[11] Patent Number: 6,160,679
[45] Date of Patent: Dec. 12, 2000

[54] RECORDING MEDIUM DEVICE FOR USE WITH A TAPE CARTRIDGE HAVING AN AUXILIARY MEMORY VIEWABLE THROUGH A CARTRIDGE DISCRIMINATION OPENING

[75] Inventors: Katsumi Maekawa; Joichi Daiba, both of Tokyo; Satoshi Ota, Chiba; Toshiya Kurokawa, Kanagawa; Mitsunori Sakama, Tokyo; Masanori Abe, Miyagi; Takao Hiramoto, Kanagawa, all of Japan

[73] Assignee: Sony Corporation, Tokyo, Japan

[21] Appl. No.: 08/973,760

[22] PCT Filed: Jul. 1, 1996

[86] PCT No.: PCT/JP96/01823

§ 371 Date: Apr. 13, 1998

§ 102(e) Date: Apr. 13, 1998

[87] PCT Pub. No.: WO97/02565

PCT Pub. Date: Jan. 23, 1997

[30] Foreign Application Priority Data

Jun. 30, 1995 [JP] Japan .................................... 7-166638
Feb. 29, 1996 [JP] Japan .................................... 8-043801

[51] Int. Cl.$^7$ ............................................. G11B 23/087
[52] U.S. Cl. ......................... 360/132; 242/338; 242/344; 242/347
[58] Field of Search ................................. 360/96.5, 132; 242/338, 344, 347

[56] References Cited

U.S. PATENT DOCUMENTS

| | | | |
|---|---|---|---|
| 5,412,525 | 5/1995 | Ota et al. | 360/132 |
| 5,434,721 | 7/1995 | Sawada et al. | 360/69 |
| 5,455,722 | 10/1995 | Fujii et al. | 360/60 |
| 5,541,796 | 7/1996 | Sawada | 360/132 |
| 5,638,239 | 6/1997 | Ohgi | 360/132 |
| 5,666,251 | 9/1997 | Fujii et al. | 360/132 |
| 5,784,227 | 7/1998 | Kitamura et al. | 360/132 |
| 5,791,578 | 8/1998 | Kurokawa et al. | 242/338.3 |
| 5,847,898 | 12/1998 | Suzuki et al. | 360/96.5 |
| 5,926,351 | 7/1999 | Abe | 360/132 |
| 6,005,754 | 12/1999 | Ohgi | 360/132 |

FOREIGN PATENT DOCUMENTS

| | | |
|---|---|---|
| 58-173091 | 11/1983 | Japan . |
| 0696555 | 4/1994 | Japan . |
| 6-119743 | 4/1994 | Japan . |

*Primary Examiner*—Jefferson Evans
*Attorney, Agent, or Firm*—Jay H. Maioli

[57] ABSTRACT

A recording medium device including a cartridge body within which a tape-shaped recording medium on which information signals are recorded is accomodated, wherein a cartridge discrimination opening (hole) indicating the specification of the recording medium device is provided at the bottom surface side of the cartridge body and positioned in the corner of the portion of the back (face) side opposite to the front side of the cartridge body from which the tape shaped recording medium is drawn out. In addition, a recording and/or reproducing apparatus with a detection mechanism for detecting the cartridge discrimination opening (hole) is provided. The cartridge discrimination opening (hole) is provided in the area where it was previously known to provide plural recording medium specification openings (holes) but which are not provided in the cartridge body.

18 Claims, 23 Drawing Sheets

RECORDING MEDIUM DEVICE FOR USE WITH A TAPE CARTRIDGE HAVING AN AUXILIARY MEMORY VIEWABLE THROUGH A CARTRIDGE DISCRIMINATION OPENING

TECHNICAL FIELD

This invention relates to a recording medium device adapted so that a tape-shaped recording medium like a magnetic tape, or a disc-shaped recording medium such as an optical disc or a magnetic disc, etc. on which information signals are recorded is accommodated within the cartridge body, and a recording and/or reproducing apparatus using such a recording medium device as a recording medium. More specifically, this invention relates to a recording medium device capable of carrying out discrimination with respect to any other recording medium device different in the specification, etc. of a recording medium accommodated within the cartridge body while being substantially common in the external shape of the cartridge body within which the recording medium is accommodated, and a recording and/or reproducing apparatus using such a recording medium device as a recording medium.

BACKGROUND ART

Hitherto, as a recording medium for a recording and/or reproducing apparatus such as a tape recorder or a video tape recorder, etc., a tape cartridge adapted so that a magnetic tape is accommodated within the cartridge body is used.

In the tape cartridge of this kind, tape cartridges within which a magnetic tape of which tape width is caused to be 8 mm is accommodated have been widely used. In such tape cartridges, tape cartridges used as a recording medium of a recording and/or reproducing apparatus used as an external unit of information processing equipment such as computer and used for exclusively recording data signals such as computer data, etc. which are digital signals, and tape cartridges used as a recording medium of video tape recorder and used for exclusively recording video signals or speech signals have been provided. The tape cartridge used for recording data signals and the tape cartridge used for recording video signals or speech signals are caused to be of the structure in which magnetic tapes of which tape widths are caused to be 8 mm are respectively accommodated within cartridge bodies caused to be in correspondence with each other in the dimensions and substantially common in the external shape. For this reason, it is extremely difficult to discriminate between the tape cartridge used for recording data signals and the tape cartridge used for recording video signals or speech signals by visual observation.

Meanwhile, magnetic tapes accommodated within the tape cartridge used for recording data signals and the tape cartridge used for recording video signals or speech signals are different from each other in the specification such as magnetic medium used, etc. Namely, the magnetic tape used in the tape cartridge for recording data signals has large recording capacity as compared to the magnetic tape used in the tape cartridge for recording video signals and speech signals, and is also required to guarantee large error rate with respect to data signals to be recorded. For this reason, in the case where the tape cartridge for recording video signals or speech signals is erroneously loaded into the recording and/or reproducing unit of the information processing equipment so that it is used as the tape cartridge for recording data signals, there might take place inconveniences such that, because of insufficient recording capacity, a necessary data signal fails to be recorded, or is missing.

In view of the above, as the tape cartridge within which the magnetic tape of which tape width is caused to be 8 mm is accommodated, there are used tape cartridges provided with discrimination holes indicating the specification of a magnetic tape accommodated within the cartridge body or right or wrong state of recording of information signals with respect to the magnetic tape.

As shown in FIG. 1, this tape cartridge 1 includes a cartridge body 4 in which a pair of upper and lower halves 2, 3 are butt-joined (connected), and is adapted to rotatably support a pair of tape reels 5, 6 within the cartridge body 4. Between these tape reels 5, 6, a magnetic tape 7 is wound. This magnetic tape 7 is drawn out toward the external of the cartridge body 4 through opening portions 8, 9 for drawing the tape provided on both sides of the front side of the cartridge body 4, and is caused to undergo traveling operation across the pair of tape reels 5, 6.

At the front side of the cartridge body 4, a front cover 10 which covers the magnetic tape 7 drawn out toward the front side of the cartridge body 4 is rotatably attached.

Moreover, at the bottom surface side of the cartridge body 4, as shown in FIG. 2, there are provided reel drive shaft insertion holes 11, 12 adapted to face hub portions 5a, 6a provided at the central portions of the tape reels 5, 6 toward the external, and through which reel drive shafts engaged with the hub portions 5a, 6a to allow the tape reels 5, 6 to undergo rotational operation are respectively inserted. Further, at the bottom surface side of the cartridge body 4 and on both sides of the back (face) side opposite to the front side where the front cover 10 is attached, there are provided positioning holes 13, 14 adapted so that when the tape cartridge 1 is loaded into the recording and/or reproducing apparatus (unit), positioning pins provided at the unit side are engaged therewith to carry out positioning of the cartridge body 4.

Further, at the bottom surface side of the cartridge body 4 and at one corner portion of the back side close to the positioning holes 13, 14, two tape specification discrimination holes 15 indicating the specification such as thickness or kind, etc. of the magnetic tape 7 accommodated within the tape cartridge 1 and a single erroneous recording prevention hole 16 are provided. Moreover, at the other corner portion, three tape specification discrimination holes 15 (in total) are provided in place of the provision of the erroneous recording prevention hole 16. These tape specification discrimination holes 15 and the erroneous recording prevention hole 16 respectively indicate the specification of the magnetic tape 7 and right or wrong state of recording of information signal onto the magnetic tape 7 in dependency upon opened or closed state.

The positioning holes 13, 14, the tape specification discrimination holes 15 and the erroneous recording prevention hole 16 are provided in the state positioned at the outer circumferential side of the tape reels 5, 6 accommodated within the cartridge body 4. Among these holes, the tape specification discrimination holes 15 and the erroneous recording prevention hole 16 are provided in the state positioned at the back side of the cartridge body 4 relative to the line $L_1$ connecting centers of the positioning holes 13, 14 provided on the both sides of the cartridge body 4. In addition, the three tape specification discrimination holes 15 provided at the other corner portion are provided in a manner arranged so as to take a triangle shape as shown in FIG. 3.

Meanwhile, the above-described tape cartridge 1 is adapted so that when loaded into the recording and/or reproducing unit, the opened or closed states of the tape specification discrimination holes 15 and the erroneous recording prevention hole 16 are detected by a detecting switch provided at the unit side, whereby detection as to whether or not the specification of the magnetic tape 7 and the loaded tape cartridge 1 are placed in the recordable state is carried out. For this reason, there is the problem that since as long as the tape cartridge 1 is not loaded at a predetermined loading position of the recording and/or reproducing unit, detections of the specification of the magnetic tape 7 and/or right or wrong state of recording of information signals are not carried out, it is difficult or impossible to immediately load a tape cartridge adapted to the recording and/or reproducing unit.

Moreover, since the above-described tape cartridge 1 is adapted to indicate information of the specification of the magnetic tape 7 and/or right or wrong state of recording of information signal by the holes provided at the cartridge body 4, it is difficult to provide (holes for) a larger number of discrimination information. In view of the above, in the tape cartridge 1 of this kind, the content of the information signal recorded on the magnetic tape 7 is described on label, etc. stuck on the cartridge body 4. However, also with respect to such a label, because of limitation in size (dimensions), it is difficult to describe a large quantity of information. Further, with respect to the tape cartridge where information signals which require secrecy are recorded, it is impossible to describe its content on the label. In the case of such a method using label, e.g., in the case where a large number of tape cartridges are accommodated within a rack unit, etc. to take out a necessary tape cartridge from those cartridges, an operation to take out tape cartridges, one by one, every time from the rack unit to confirm (the description of) the label is required. In addition, with respect to the tape cartridge in which the content described is unable to be read as the result of the fact that the label is separated (peeled) off or is soiled, or the tape cartridge of which content is not described, it is required to load corresponding cartridge into the recording and/or reproducing unit to carry out reproducing operation every time to confirm it. This is extremely troublesome.

As a tape cartridge which has solved such problems, as disclosed in the Japanese Patent Application Laid Open No. 74880/1981, a tape cartridge provided with an auxiliary memory unit including memory element constituted with integrated circuit element which permits recording of information signals within the cartridge body has been proposed. This tape cartridge in which such memory element is mounted (assembled) is constituted so that discrimination information which are various information, e.g., specification, use state or recording position of the magnetic tape, or the content of recorded information signal etc. are stored into the memory element.

When this tape cartridge is loaded into the recording and/or reproducing unit (apparatus), discrimination information stored in the memory element is read by the auxiliary recording/reproduction unit prior to the loading operation of the magnetic tape, and new discrimination information is stored into the memory element by the auxiliary recording/reproduction unit when the recording/reproduction operation is completed. Accordingly, in accordance with the tape cartridge, various discrimination information are utilized, thereby making it possible to greatly widen the use range of the tape cartridge. In addition, this is extremely advantageous in the case of handling a large number of tape cartridges.

For example, the tape cartridge in which the memory element is mounted (assembled) is adapted so that in the case where the above-described recording and/or reproducing apparatus provided with the rack unit is used to carry out recording and/or reproduction of information signals, or the like, necessary discrimination information can be obtained with ease from the memory element without carrying out loading operation of the magnetic tape every time. Accordingly, reduction of the retrieval time, etc. can be realized. This is extremely advantageous.

Meanwhile, since the memory element constituting the auxiliary memory unit is disposed within the cartridge body, it is impossible to confirm it by visual observation. Moreover, various memory elements may be used in dependency upon the specification of the tape cartridge as the memory element disposed within the cartridge body. As stated above, since it is impossible to confirm the memory element disposed within the cartridge by visual observation, even if no memory element is attached, or any memory element different in the memory capacity or the kind from a predetermined memory element is disposed, it is extremely difficult to discriminate it. Further, when the tape cartridge is loaded into the recording and/or reproducing apparatus provided with dedicated auxiliary recording/reproduction unit corresponding to the individual specification in the state where no memory element is attached, or in the state where memory element different in the memory capacity or the kind is attached, there may result an erroneous operation such that any missing (in information) takes place in the recording and/or reproducing operations of information signals with respect to the memory element.

Moreover, in the case of the tape cartridge in which the auxiliary memory unit including memory element is mounted (assembled), in carrying out reproduction of discrimination information stored in the memory element or storage of discrimination information into the memory element, electrical connection to the auxiliary recording/reproduction unit side is required. For this reason, in the tape cartridge, contact terminals connected to the memory element are provided at the cartridge body. Thus, in the state where the tape cartridge is loaded in the recording and/or reproducing apparatus, the terminal members of the auxiliary recording/reproduction unit are connected to these contact terminals so that input/output of discrimination information is carried out.

When a tape cartridge as described above provided with no contact terminal is erroneously loaded into the recording and/or reproducing apparatus using such tape cartridge provided with contact terminals as the recording medium, there is the possibility that a portion of the tape cartridge may collide with (against) the auxiliary recording/reproduction unit so that connector and/or connection terminals constituting the auxiliary recording/reproduction unit are broken.

In the tape cartridge in which the auxiliary memory unit is mounted (assembled), when the contact terminals of the memory element are placed in the state exposed to the outside of the cartridge body, dust, etc. is adhered. As a result, such contact terminals are soiled. Further, there are instances where there takes place inconvenience such that unsatisfactory contact with the terminal member of the auxiliary recording/reproduction means side takes places resulting from the fact that gold plating implemented on the surface of the contact terminal is corroded, or the like so that recording of discrimination information into the memory element or reproduction of discrimination information from the memory element is not normally carried out. Further, in the tape cartridge, there also takes place a problem such that dust, etc. is admitted from the portion where the contact terminals are disposed into the cartridge body and is attached on the magnetic tape, thus degrading the reproduction accuracy.

In addition, there is the possibility that when finger, etc. of user comes into contact with the contact terminal in the exposed state, there is the possibility that the memory element may be charged (electrified). When electrification (charged state) takes place in the memory element, there takes place an inconvenience such that recording of discrimination information or reproduction of discrimination information may not be normally carried out.

DISCLOSURE OF THE INVENTION

An object of this invention is to provide a recording medium device and a recording and/or reproducing apparatus, which permit reliable protection of the recording medium device and the recording and/or reproducing apparatus into which such recording medium device is loaded.

Another object of this invention is to provide a recording medium device capable of easily carrying out discrimination with respect to other recording medium devices which are different in the specification, etc. of recording media respectively accommodated within cartridge bodies while being substantially common in the external shape of the cartridge bodies within which the recording media are respectively accommodated.

A further object of this invention is to provide a recording medium device and a recording and/or reproducing apparatus, which limit loading of recording medium devices different in the specification to permit protection of the recording medium device and the recording and/or reproducing apparatus into which such recording medium device is loaded.

A still further object of this invention is to provide a recording medium device provided with an auxiliary memory unit, which can easily carry out discrimination of presence or absence of the auxiliary memory unit mounted within the device body and discrimination of the mounted auxiliary memory unit.

A still more further object of this invention is to provide a recording medium device provided with an auxiliary memory unit and a recording and/or reproducing apparatus, which realize protection of the auxiliary memory unit and connection terminals to which the auxiliary memory unit is electrically connected, which are disposed at the recording and/or reproducing apparatus side.

A recording medium device according to this invention includes a cartridge body within which a tape-shaped recording medium on which information signals are recorded is accommodated, wherein a cartridge discrimination hole indicating the specification of the recording medium device is provided at the bottom surface side of the cartridge body and in a manner positioned in the vicinity of a corner portion of the back (face) side opposite to the front side of the cartridge body from which the tape-shaped recording medium is drawn out.

Moreover, the recording medium device according to this invention is adapted so that an auxiliary memory unit in which information recorded onto the recording medium and/or information relating to the recording medium are stored (recorded) is disposed at a position where visual observation can be made through a cartridge discrimination hole formed as a penetration hole of the cartridge body.

Further, a recording and/or reproducing apparatus according to this invention includes a recording medium loading portion into which a recording medium device is loaded, the recording medium device comprising a cartridge body within which a tape-shaped recording medium on which information signals are recorded is accommodated, and being such that a cartridge discrimination hole is provided at the bottom surface side of the cartridge body and in a manner positioned in the vicinity of a corner portion of the back (face) side opposite to the front side of the cartridge body from which the tape-shaped recording medium is drawn out, wherein cartridge discrimination means admitted into the cartridge discrimination hole is provided at the recording medium loading portion.

Further, a recording medium device according to this invention includes: a cartridge body within which a recording medium is accommodated; a contact terminal disposed in a manner positioned at the inside of a terminal opening portion opened at the outer circumferential portion of the cartridge body and electrically connected to a connector of an external device; a shutter member interposed between the terminal opening portion and the contact terminal to open or close the terminal opening portion; and a cartridge discrimination hole indicating the specification of the recording medium device provided in a manner positioned at a corner portion of the bottom surface side of the cartridge body, wherein the cartridge discrimination hole is caused to have a function as an admission hole into which a shutter drive member of the external device side for carrying out movement operation of the shutter member is admitted.

Within the cartridge body, there is disposed an auxiliary memory unit including a memory element in which specification information of the recording medium and/or discrimination information such as content, etc. of recording information recorded on the recording medium are stored.

BEST MODE FOR CARRYING OUT THE INVENTION

More practical embodiments of this invention will now be described with reference to the attached drawings.

In the embodiments disclosed below, this invention is applied to a tape cartridge adapted so that, as a recording medium, a magnetic tape which is a tape-shaped recording medium is caused to be accommodated into a cartridge body.

A tape cartridge 21 of the first embodiment according to this invention is adapted so that a magnetic tape 27 of which tape width is caused to be 8 mm is accommodated therewithin. Further, the tape cartridge 21 of this embodiment is used as a recording medium of an information processing unit such as computer, etc., and is constituted so as to have a sufficiently large recording (memory) capacity as compared to the tape recorder cartridge for video tape recorder used for exclusively carrying out recording of video signals or speech signals.

Figure 1:
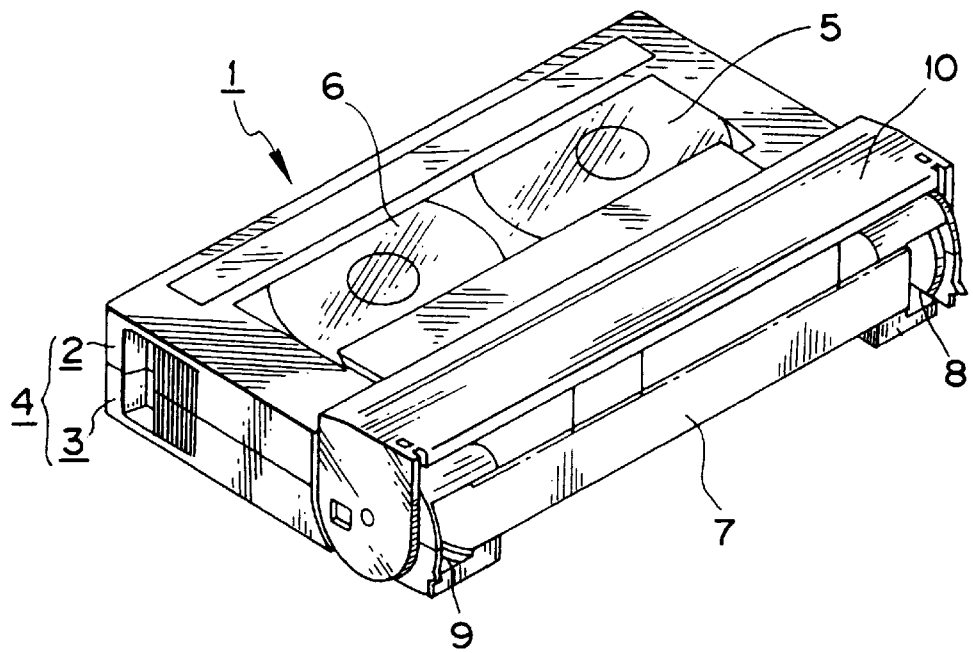
FIG. 1 is a perspective view showing a conventional tape cartridge.
Figure 2:
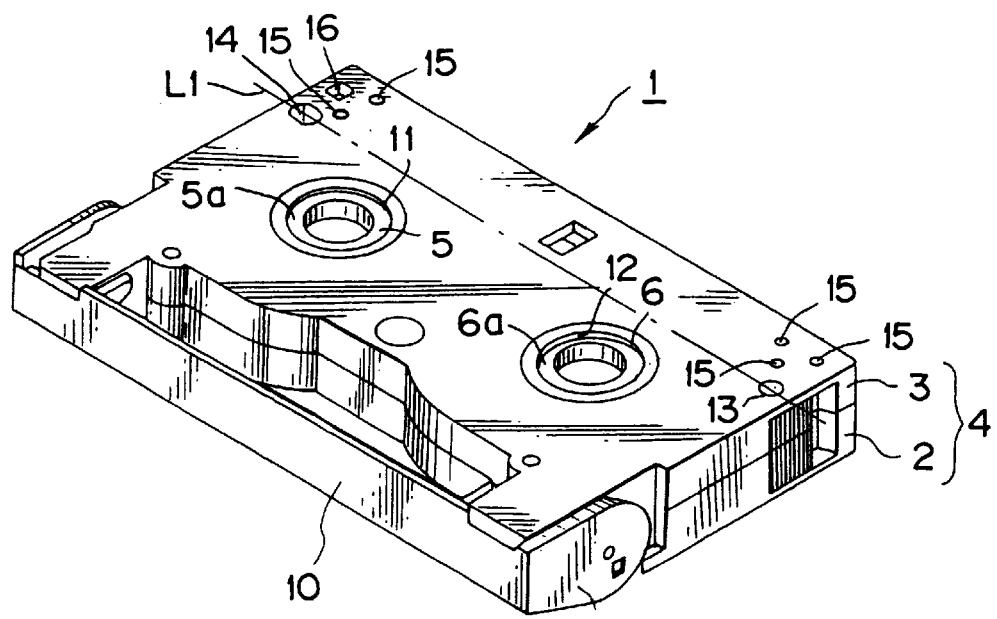
FIG. 2 is a perspective view showing the bottom surface side of the tape cartridge.
Figure 3:
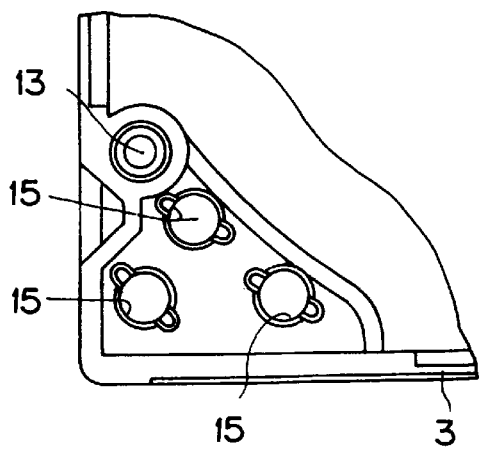
FIG. 3 is a plan view of the internal surface side of the tape cartridge showing arrangement state of tape specification discrimination holes and erroneous recording prevention hole.

The tape cartridge 21 constituted as a tape cartridge for recording data signal is formed so as to have an external shape caused to be substantially in correspondence with the external shape of the tape cartridge 1 for video tape recorder within which there is accommodated magnetic tape 7 caused to have tape width of 8 mm, which is constituted as a tape cartridge for exclusively recording video signals or speech signals shown in the FIGS. 1 and 2 previously mentioned. Namely, the tape cartridge 21 of this embodiment and the tape cartridge 1 for video tape recorder are formed so that they are common in width, length and thickness.

Figure 4:
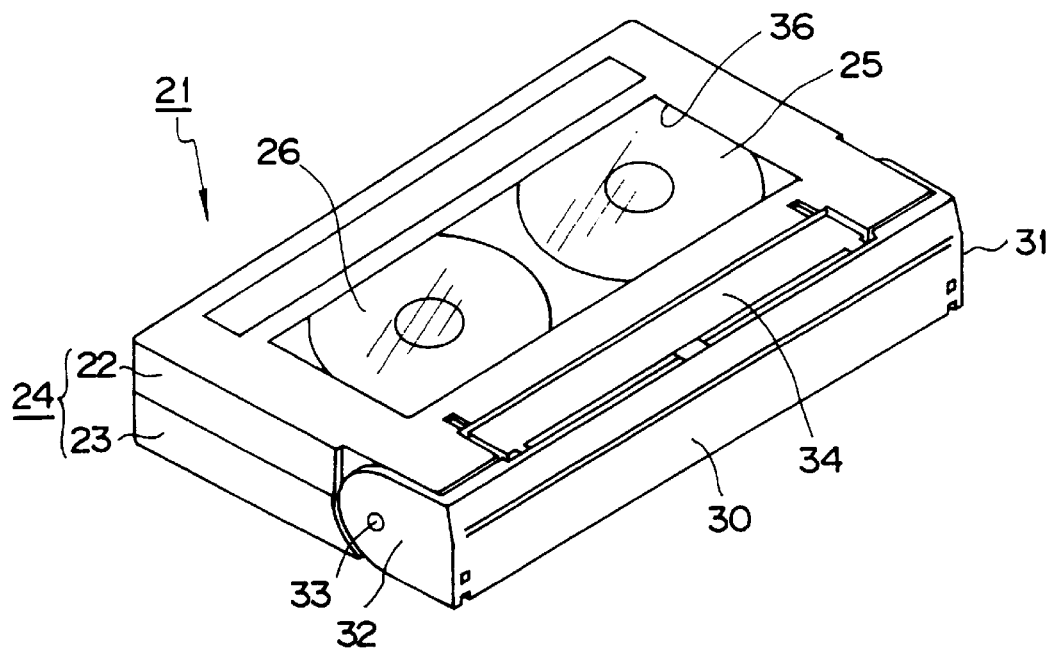
FIG. 4 is a perspective view showing a tape cartridge of a first embodiment of this invention.
Figure 5:
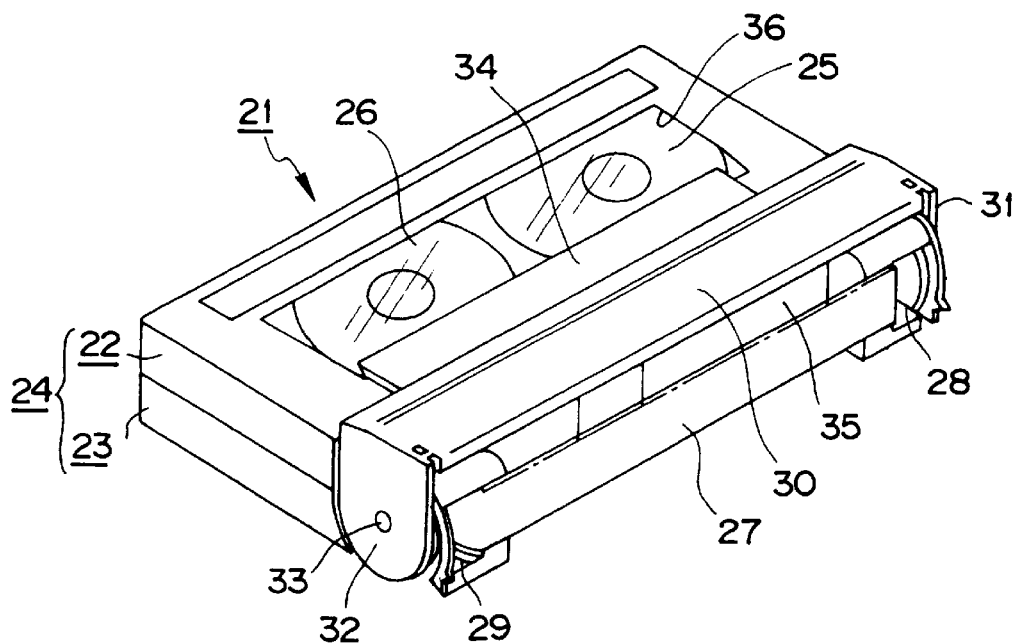
FIG. 5 is a perspective view showing the state where front cover of the tape cartridge is opened.

As shown in FIGS. 4 and 5, the tape cartridge 21 of this embodiment includes a cartridge body 24 in which a pair of upper and lower halves 22, 23 are butt-joined similarly to the tape cartridge 1 for video tape recorder, and is adapted to rotatably support a pair of tape reels 25, 26 within the cartridge body 24. Between these tape reels 25, 26, magnetic tape 27 is wound. As this magnetic tape 27, there is used a magnetic tape of the specification which permits recording of data signals handled in information processing unit such as computer, etc. in such a manner to maintain satisfactory recording characteristic and to have sufficiently large recording (memory) capacity.

As shown in FIG. 5, the magnetic tape 27 wound between a pair of tape reels 25, 26 is drawn out toward the external of the cartridge body 24 through opening portions 28, 29 for drawing tape provided on the both sides of the front side of the cartridge body 24, and is caused to undergo traveling operation across the pair of tape reels 25, 26.

At the front side of the cartridge body 24, a front cover 30 which covers the magnetic tape 27 drawn out toward the front side of the cartridge body 24 is rotatably attached. This front cover 30 is adapted so that rotational pieces 30a, 30b provided in a projected manner (hereinafter simply referred to as "projected" as occasion may demand) in a manner opposite to each other on the both sides thereof are pivotally supported at both sides of the front side of the cartridge body 24 through supporting pins 33, whereby the front cover 30 is rotationally operated within the range between the position shown in FIG. 4 where the front side of the cartridge body 24 is closed and the position shown in FIG. 5 where the front side is opened with the supporting pin 33 being as center. Thus, the front covet 30 is rotationally operated so that it opens or closes the front side of the cartridge body 24. In addition, an upper cover 34 which covers a portion of the upper surface side of the cartridge body 24 is attached at the front cover 30 so that it is synchronously rotated.

Figure 6:
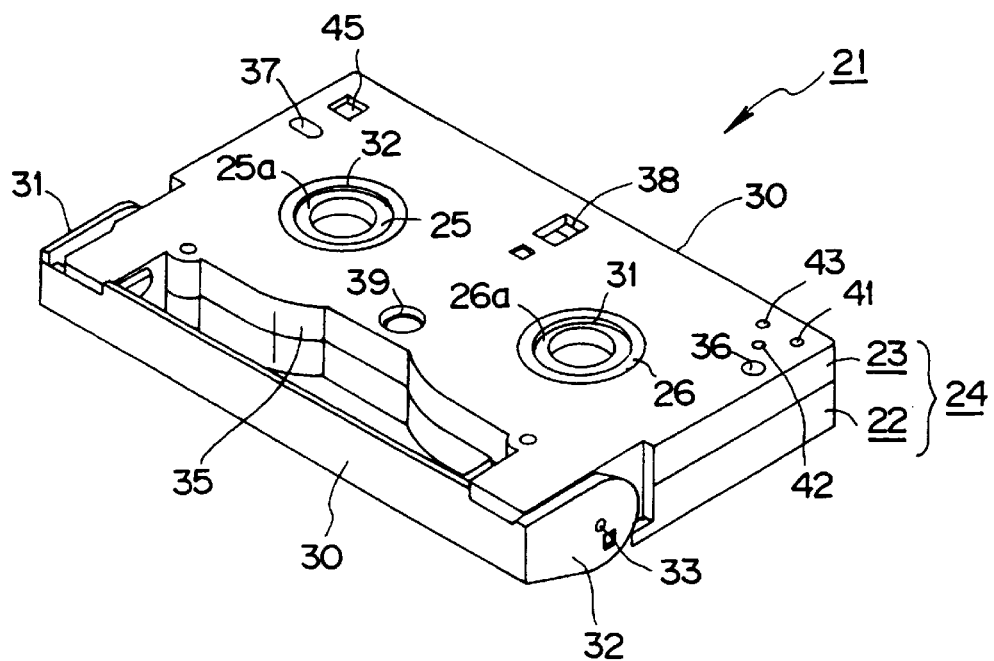
FIG. 6 is a perspective view showing the bottom surface side of the tape cartridge.

At the front side covered by the front cover 30 of the cartridge body 24, as shown in FIG. 6, there is provided a recessed portion 35 into which a loading mechanism adapted for drawing the magnetic tape 27 from the cartridge body 24 to allow it to undergo loading into tape traveling path within recording and/or reproducing unit (apparatus) is admitted.

Moreover, at the upper surface side of the cartridge body 24, there is provided a rectangular see-through window 24a which permits visual observation of the state of the magnetic tape 27 wound between the pair of tape reels 25, 26.

Further, at the bottom surface side of the cartridge body 24, as shown in FIG. 6, there are provided reel drive shaft insertion holes 31, 32 adapted for facing hub portions 25a, 26a provided at the central portions of the tape reels 25, 26 toward the external, and through which reel drive shafts engaged with the hub portions 25a, 26a to allow the tape reels 25, 26 to undergo rotational operation are respectively inserted. Further, at the bottom surface side of the cartridge body 24 and on the both sides of the back (face) side opposite to the front side where the front cover 30 is attached, there are provided positioning holes 36, 37 adapted so that when the tape cartridge 21 is loaded into the recording and/or reproducing apparatus, positioning pins provided at the apparatus side are engaged with the positioning holes to thereby carry out positioning of loading position. Moreover, at the bottom surface side of the cartridge body 24, as shown in FIG. 6, there is provided a reel lock member operation hole 38 positioned at the central portion of the back (face) side and adapted so that the operation portion of reel lock member which limits free rotation of the tape reels 25, 26 is faced thereto. This reel lock member operation hole 38 is adapted so that when the tape cartridge 21 is loaded into the recording and/or reproducing apparatus, reel lock releasing member provided at the apparatus side is admitted into the reel lock member operation hole 38 to allow the reel lock member to undergo movement operation to thereby release lock state of the tape reels 25, 26. In addition, at the bottom surface side of the cartridge body 24, as shown in FIG. 6, there is provided a light emitting element insertion hole 39 positioned at the central portion of the front side and into which a light emitting element which constitutes terminating end detecting mechanism adapted for detecting terminating end of the magnetic tape 27 provided at the recording and/or reproducing apparatus side is inserted.

Figure 7:
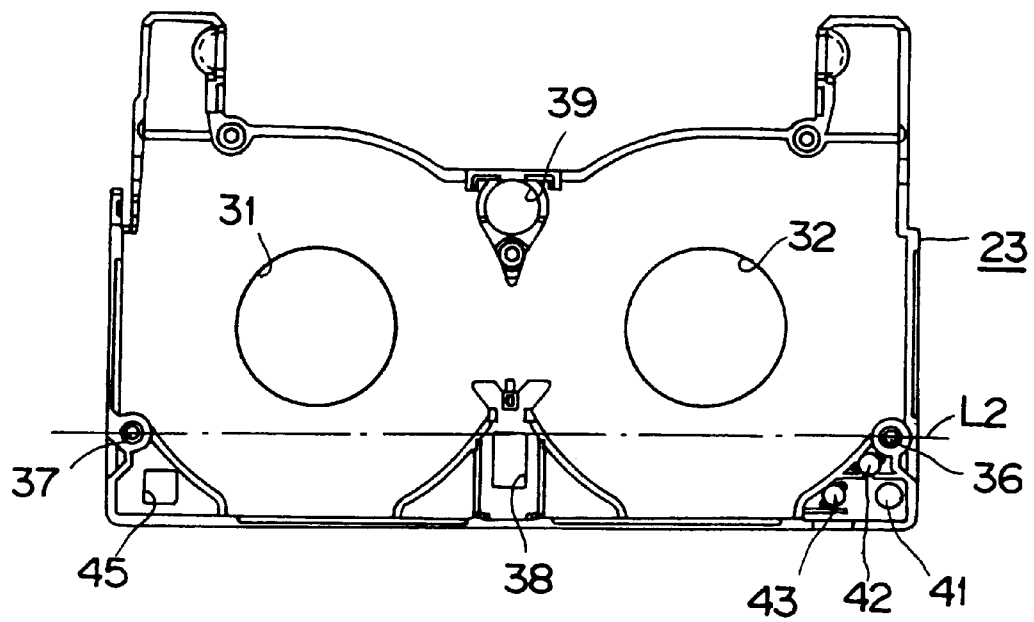
FIG. 7 is a plan view showing lower half of the tape cartridge.

Meanwhile, in the tape cartridge 21 of this embodiment, at the bottom surface side of the cartridge body 24 and at one corner portion of the back (face) side close to the positioning holes 36, 37, as shown. in FIGS. 6 and 7, there are provided two tape specification discrimination holes 41, 42 indicating specification such as thickness and/or kind, etc. of the magnetic tape 27 accommodated within the tape cartridge 21 and a single erroneous recording prevention hole 43. In this case, the tape specification discrimination holes 41, 42 indicate that the magnetic tape 27 accommodated within the tape cartridge 21 is a magnetic tape in which there is provided a magnetic recording medium having a thickness including a magnetic layer which permits recording of data signals and corresponding to the magnetic head of the recording and/or reproducing apparatus which carries out recording of data signals. In addition, the erroneous recording prevention hole 43 is caused to be placed in the state where recording of data signals can be made with respect to the magnetic tape 27. Namely, the erroneous recording prevention hole 43 is in the closed state.

Figure 8:
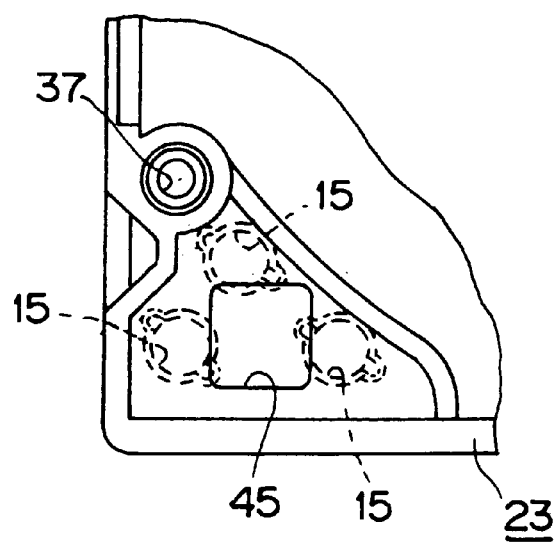
FIG. 8 is a plan view showing the position where cartridge discrimination hole provided at the tape cartridge is provided.

Further, at the bottom surface side of the cartridge body 24 and at the other corner portion of the back (face) side close to the other positioning hole 37, as shown in FIGS. 6 and 8, there is provided a discrimination hole 45 of the tape cartridge indicating that this tape cartridge 21 is the data recording tape cartridge, and with which erroneous loading prohibiting member for prohibiting erroneous loading of the tape cartridge provided at the recording and/or reproducing apparatus side where the tape cartridge 21 is loaded is engaged. This discrimination hole 45 is formed so as to take rectangular shape which is greater than the tape specification discrimination holes 41, 42. Further, as shown in FIG. 8, the discrimination hole 45 is provided at position corresponding to the area where three tape specification discrimination holes 15 provided at the other corner portion of the bottom surface side of the previously described tape cartridge 1 for video tape recorder are not provided. Since the discrimination hole 45 is provided at such a position, even in the case where the tape cartridge 21 of this embodiment is loaded into the video tape recorder in which the tape cartridge 1 constituted as shown in FIGS. 1 and 2 is exclusively used, detection of the detection hole 45 by detecting means for detecting tape specification discrimination hole 15 provided at the other corner portion of the tape cartridge 1, which is provided at the video tape recorder side, is limited. Accordingly, in the case of the tape cartridge 21 of this embodiment, since, when loaded into the video tape recorder, it is prevented that the discrimination hole 45 is detected by the tape specification detecting means of the video tape recorder side, it becomes possible to use such tape cartridge 21 also as the recording medium for video tape recorder.

Further, also in the case of the tape cartridge 21 of this embodiment, similarly to the previously described tape cartridge 1, the positioning holes 36, 37, the tape specification discrimination holes 41, 42, the erroneous recording prevention hole 43 and the discrimination hole 45 are provided in the state positioned at the outer circumferential side of the tape reels 25, 26 accommodated within the cartridge body 24. Namely, they are provided in the state positioned at the outer circumferential side of the maximum winding diameter of the magnetic tape 27 wound on the tape reels 25, 26. Among these holes, as shown in FIG. 7, the tape specification discrimination holes 41, 42, the erroneous recording prevention hole 43 and the discrimination hole 45 are provided in the state positioned at the back (face) side of the cartridge body 24 relative to line $L_2$ connecting centers of the positioning holes 36, 37 provided on the both sides of the cartridge body 24. By providing respective holes 41, 42, 43 and 45 in this way, it is possible to prevent traveling of the magnetic tape 27 from being impeded by detecting means of the recording and/or reproducing apparatus side for detecting the state of these holes 41, 42, 43 and 45. Thus, reliable detection of the state of the respective holes 41, 42, 43 and 45 by the detecting means can be made.

An example of a drive unit which is the recording and/or reproducing apparatus used as an external memory unit of an information processing equipment in which the above-described tape cartridge 21 according to this invention is used as the recording medium will now be described. This drive unit includes a cartridge discrimination mechanism adapted for carrying out detection of the cartridge discrimination hole 45 to permit loading of the tape cartridge 21 which aims at recording data signals, and to limit loading of the previously described tape recorder cartridge 1 for video tape recorder.

Figure 9:
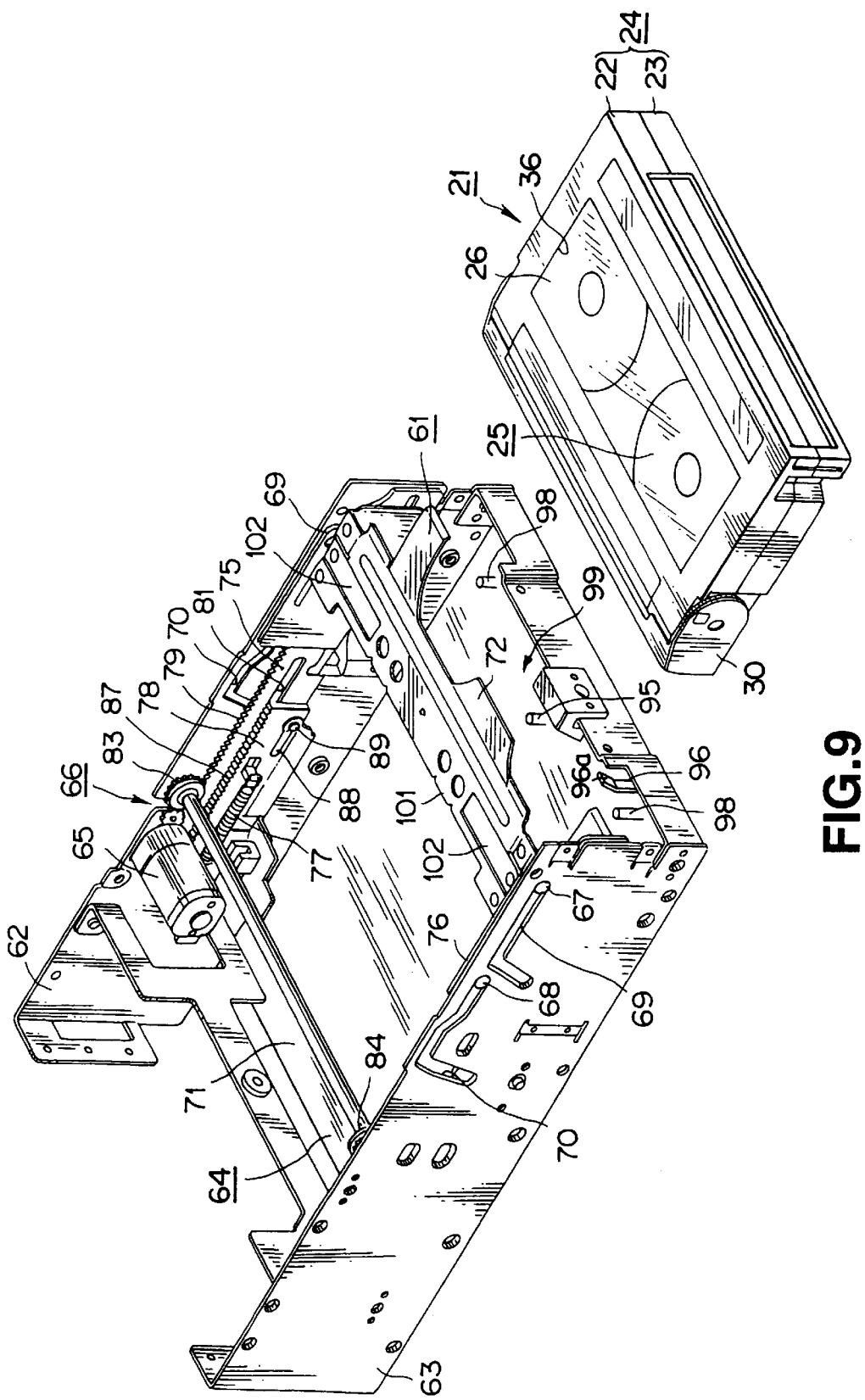
FIG. 9 is a perspective view showing cartridge loading unit for allowing the tape cartridge according to this invention to undergo loading operation into cartridge loading portion of drive unit.
Figure 10:
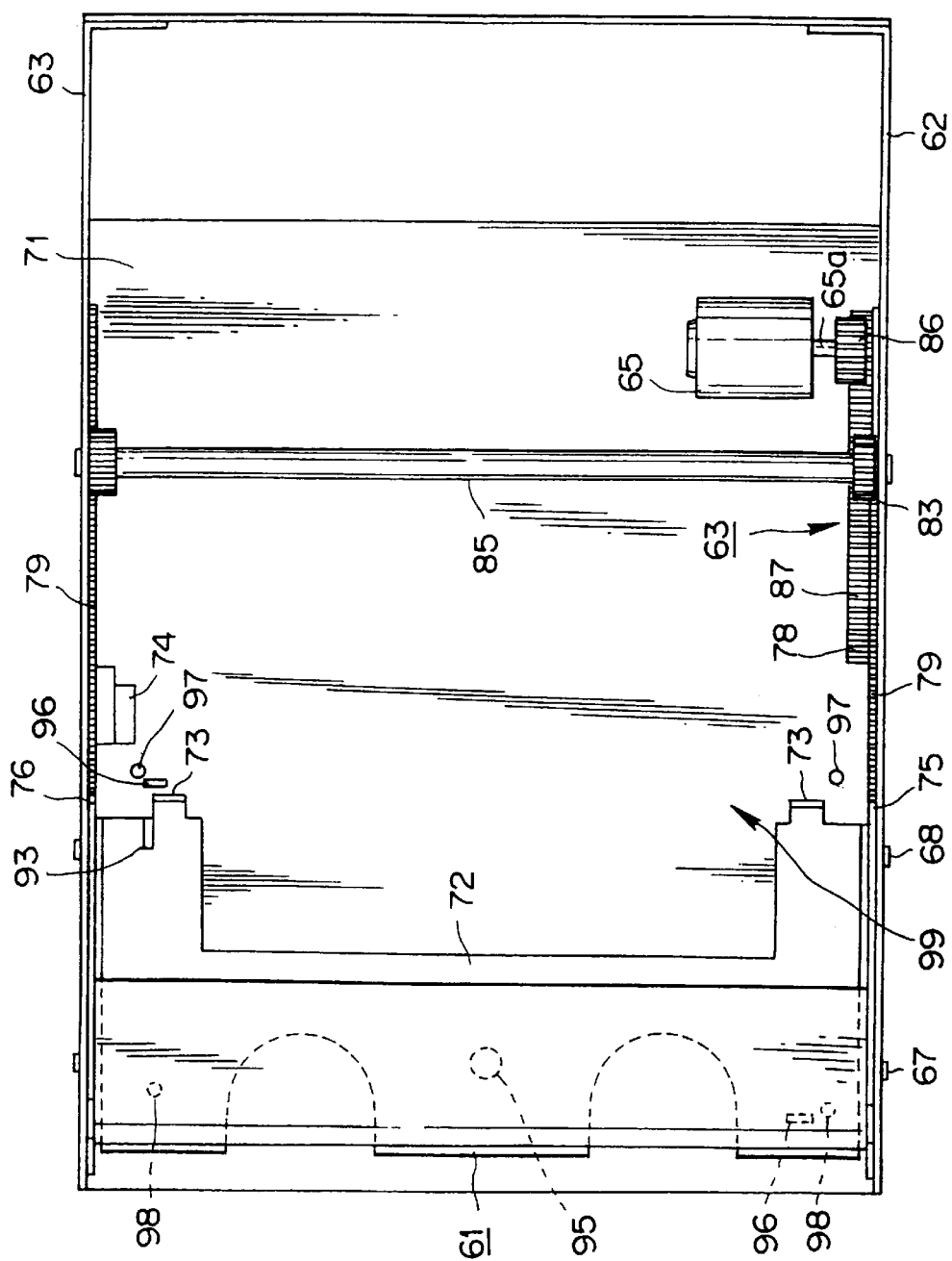
FIG. 10 is a plan view of the cartridge loading unit.
Figure 11:
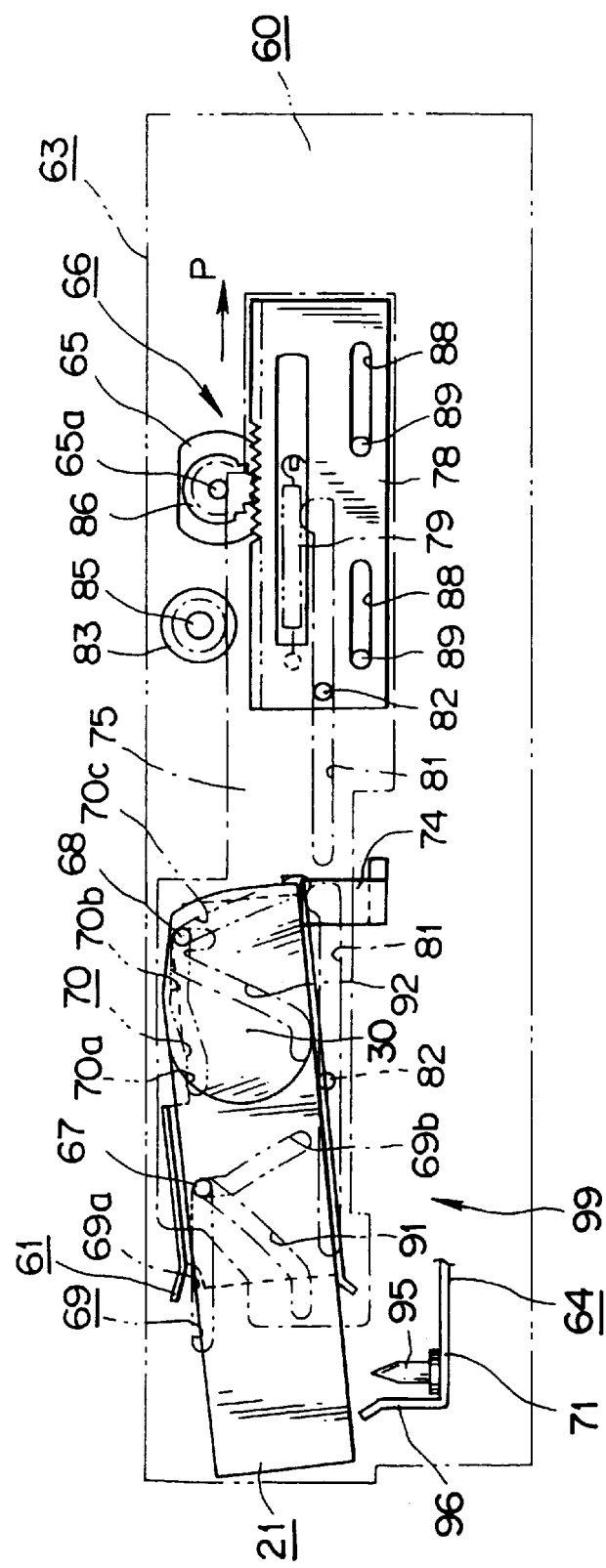
FIG. 11 is a side view of the cartridge loading unit showing the initial operation state where the tape cartridge is inserted into cartridge holder so that it is held, and the cartridge holder is caused to undergo drawing operation toward the cartridge loading position side.

As shown in FIGS. 9 and 10, this drive unit comprises a cartridge loading unit 60 including a cartridge holder 61 in which the tap cartridge 21 is inserted so that it is held, and a chassis 64 provided with a pair of side plates 62, 63 for supporting the cartridge holder 61 so that it can be moved within the range between the cartridge insertion/withdrawal position and the cartridge loading position. As shown in FIGS. 9 and 11, this cartridge loading unit 60 comprises a holder movement operation mechanism 66 including a drive motor 65 for allowing the cartridge holder 61 to undergo movement operation within the range between the cartridge insertion/withdrawal position and the cartridge loading position.

In the cartridge holder 61, slide guide pins 67, 68 are projected by respective pairs at the outside surface side of the side walls opposite to each other. This cartridge holder 61 is disposed between the pair of side plates 62, 63 in the state where these slide guide pins 67, 68 are inserted through slide guide grooves 69, 70 so that they are supported, the slide guide grooves being bored at a pair of side plates 62, 63 vertically provided on both sides opposite to each other of the chassis 64. Further, the cartridge holder 61 is caused to undergo movement operation within the range between the cartridge insertion/withdrawal position and the cartridge loadable position while movement directions of the slide guide pins 67, 68 are guided by the slide guide grooves 69, 70.

Meanwhile, as shown in FIG. 11, one slide guide groove 69 positioned at the external side of the apparatus body is such that a horizontal guide groove 69a and an inclined guide groove 69b inclined toward the cartridge loading portion 99 side constituted on a bottom plate 71 of the chassis 64 are formed in order. On the other hand, as shown in FIG. 11, the other slide guide groove 70 positioned at the internal side of the apparatus body is such that an inclined guide groove 70a inclined toward the upper direction from the bottom plate 71 of the chassis 64, a horizontal guide groove 70b and an inclined guide groove 70c inclined toward the cartridge loading portion 99 side are formed in order. The cartridge holder 61 moved from the cartridge insertion/withdrawal position side toward the cartridge loadable position side while being guided by the slide guide grooves 69, 70 formed in this way is elevated in such a manner that the front end side is once rotated toward the upper direction with the slide guide pin 67 inserted through one slide guide groove 69 being as center, and is thereafter caused to be in the state horizontal to the bottom plate 71 of the chassis 64. Then, the cartridge holder 61 is moved so as to fall down toward the bottom plate 71 of the chassis 64.

At the front end side of a bottom plate 72 of the cartridge holder 61, i.e., on the both sides of the front end of the insertion direction side of the tape cartridge 21, as shown in FIG. 10, there are projected contact pieces 73, 73 which are in contact with a portion of the front side of the tape cartridge 21 inserted into the cartridge holder 61 to limit insertion position of the tape cartridge 21. At the side where one contact piece 73 is provided of the bottom plate 72 of the cartridge holder 61, there is formed in a rising form (hereinafter simply referred to as "rising-formed" as occasion may demand) a cover lock releasing piece 93 for rotationally operating the lock lever which locks the front cover 30 of the tape cartridge 21 inserted into the cartridge holder 61 and held thereby so that it is placed at the closed position, thus to release the locked state of the front cover 30.

The holder movement operation mechanism 66 comprises, as shown in FIG. 11, a pair of slide plates 75, 76 disposed at the inside surface side of a pair of side plates 62, 63, and a limiter plate 78 connected to one slide plate 75 through a limiter spring 77. In a pair of slide plates 75, 76, a rack gear 79 is provided in a projected manner along the length direction at the upper edge side. These slide plates 75, 76 are supported, in the state where supporting pins 82 vertically provided on the side plates 62, 63 are inserted through elongated holes 81 bored along the length direction in such a manner that they are supported so that they can be moved within the range of the elongated hole 81. Moreover, a pair of slide plates 75, 76 are connected through a drive force transmission shaft 85 in which gears 83, 84 meshed with the rack gears 79, 79 are attached on the both ends thereof, and are caused to undergo slide operation in the same direction in a manner synchronous with each other. Also at the upper edge side of the limiter plate 78, a rack gear 87 is provided in a projected manner. A drive gear 86 attached to an output shaft 65a of the drive motor 65 attached through one side plate 62 is meshed with the rack gear 87.

In this example, the limiter plate 78 connected to one slide plate 75 through the limiter spring 77 is supported so that it can be moved with respect to one slide plate 75 within the range of an elongated hole 88 in the state where the supporting pin 89 vertically provided on one slide plate 75 is inserted through the elongated hole 88 and is supported thereby, the elongated hole being extended (elongated) in the length direction. Accordingly, when excessive load is applied to the limiter plate 78, the limiter spring 77 allows (permits) movement of the slide plates 75, 76 while being expanded thus to absorb such excessive load.

Further, at a pair of slide plates 75, 76, a pair of cam grooves 91, 92 are respectively bored. The slide guide pins 67, 68 of the cartridge holder 61 inserted through the slide guide grooves 69, 70 of the side plates 62, 63 so that they are supported are inserted through these cam grooves 91, 92. The cam grooves 91, 92 serve to limit the movement direction of the slide guide pins 67, 68 so that the slide guide pins 67, 68 move along the slide guide grooves 69, 70.

Moreover, at the inside surface side of the other side plate 63, as shown in FIG. 10, there is provided a cover opening member 74 for allowing the front cover 30 of the tape cartridge 21 fallen from the cartridge loadable position toward the cartridge loading portion 99 side to undergo rotational operation against biasing force of the biasing member to open the front side where the magnetic tape 27 is extended of the cartridge body 24 to thereby face this magnetic tape 27 toward the external.

Further, on the base plate 71 of the chassis 64, there is provided a reel lock releasing member 95 for releasing the locked state by the reel lock member of the pair of tape reels 25, 26 of the tape cartridge 21 loaded into the cartridge loading portion 99. This releasing member 95 is adapted so that when the tape cartridge 21 is caused to undergo loading operation into the cartridge loading portion 99, it is inserted through a reel lock member operation hole 38 provided at the bottom surface portion of the cartridge body 24 to allow the reel lock member to undergo movement operation toward the back (face) side of the cartridge body 24 against biasing force of biasing means to release lock state of respective tape reels 25, 26 to place these tape reels 25, 26 in the rotatable state.

Further, as shown in FIGS. 9, 10 and 11, on the bottom plate 71 of the chassis 64, a cartridge discrimination piece 96 which constitutes the cartridge discrimination mechanism for carrying out discrimination of the tape cartridge 21 loaded into the cartridge loading portion 99 is rising-formed. This cartridge discrimination piece 96 is formed by cutting and raising a portion of the bottom plate 71. Further, when the tape cartridge 21 is loaded into the cartridge loading portion 99, the cartridge discrimination piece 96 is admitted into the cartridge discrimination hole 45 provided at the bottom surface side of the cartridge body 24 thus to discriminate that the tape cartridge 21 loaded into the drive unit is the data recording tape cartridge. In addition, in the case where, e.g., tape cartridge 1 for video tape recorder provided with no cartridge discrimination hole 45 is loaded, the cartridge discrimination piece 96 comes into contact with the bottom surface of the cartridge body 4 to prohibit further loading operation of the tape cartridge 1 thus to limit erroneous loading.

In this example, in the cartridge discrimination piece 96, the front end side thereof is slightly bent in correspondence with movement locus of the tape cartridge 21 held by the cartridge holder 61 and caused to undergo loading operation so that an inclined portion 96a is provided.

Furthermore, on the bottom plate 71 of the chassis 64, there are vertically provided a pair of height positioning pins 97, 97 for supporting the bottom surface side of the tape cartridge 21 loaded into the cartridge loading portion 99 and a pair of positioning pins 98, 98 engaged with positioning holes 36, 37 provided at the bottom surface portion of the tape cartridge 21.

In order to allow the tape cartridge 21 to undergo loading operation into the cartridge loading portion 99 of the drive unit by using the cartridge loading unit constituted as described above, as shown in FIG. 9, the tape cartridge 21 is first inserted into the cartridge holder 61 with the front cover 30 side being at the insertion end. At this time, the tape cartridge 21 is inserted until the front end edge thereof comes into contact with the contact pieces 73, 73. Further, the tape cartridge 21 is held in the state where insertion position with respect to the cartridge holder 61 is caused to undergo positioning. At this time, the tape cartridge 21 is pressure-supported by leaf springs 102 provided at a top plate 101 of the cartridge holder 61.

When the tape cartridge 21 is inserted into the cartridge holder 61, the locked state of the front cover 30 is released by the cover lock releasing piece 93. Thus, the front cover 30 is placed in the state permitted to undergo rotational operation against biasing force of the biasing member.

When it is detected by the detecting mechanism that the tape cartridge 21 is inserted into the cartridge holder 61 so that it is held, the drive motor 65 starts drive in a forward rotation direction. When the drive motor 65 is driven, drive force is transmitted to the limiter plate 78 with which the drive gear 86 is meshed. Since this limiter plate 78 is connected to one slide plate 75 through the limiter spring 77, the slide plate 74 is slid toward the inside of the apparatus body in the direction indicated by arrow P in FIG. 11 in one body with the limiter plate 78. At this time, the other slide plate 76 connected through the drive force transmission shaft 85 is also slid in the direction indicated by arrow P in FIG. 11 in a manner synchronous therewith.

When the pair of slide plates 75, 76 are slid in the direction indicated by arrow P in FIG. 11, the cartridge holder 61 is caused to undergo movement operation in the same direction in the state where the slide guide pins 67, 68 are guided by the slide guide grooves 69, 70.

When the cartridge holder 61 is caused to undergo movement operation in the direction indicated by arrow P in FIG. 11, the other slide guide pin 68 is caused to undergo movement operation by the cam groove 92 provided at the side plate 75, and is thus moved toward the upper direction while being guided by the inclined guide groove 70a of the other slide guide groove 70. At this time, one slide guide pin 67 is positioned at the horizontal guide groove 69a of one slide guide groove 69, and is moved in the horizontal direction. Accordingly, the cartridge holder 61 is fluctuated in such a manner that the front end side is raised with one slide guide pin 69 being as center. The tape cartridge 21 held by the cartridge holder 61 is moved in the horizontal direction of the direction indicated by arrow X in FIG. 12, and is then rotated so as to drop the lower end portion of the back (face) side toward the base plate 71 side of the chassis 64 of the direction indicated by arrow Y in FIG. 12.

Figure 12:
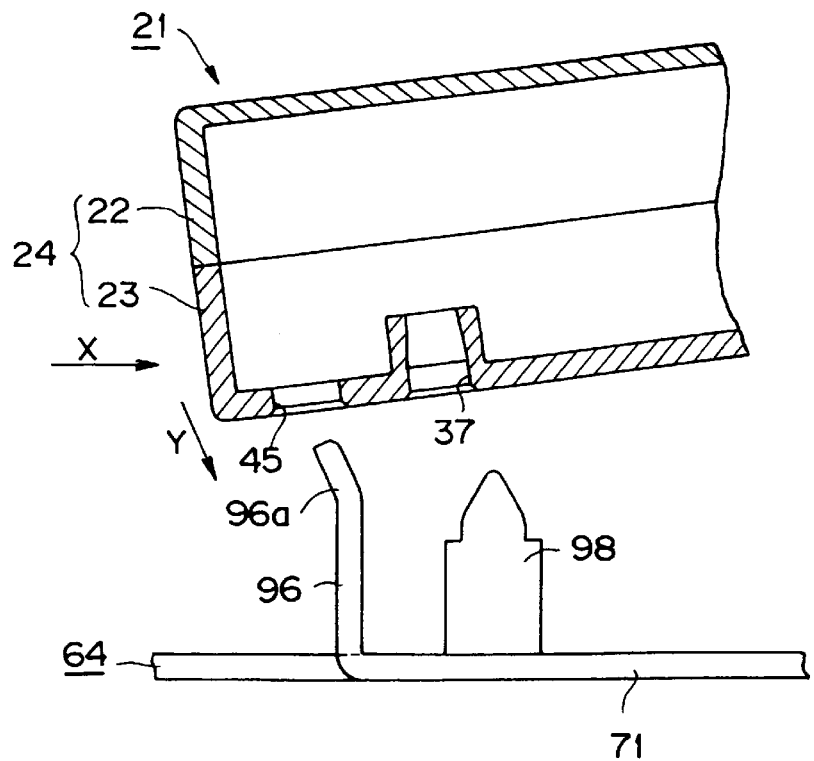
FIG. 12 is a partial side cross sectional view showing the intermediate state where the tape cartridge is loaded into the cartridge loading portion.

At this time, as shown in FIG. 12, the front end portions of the positioning pin 98 and the cartridge discrimination piece 96 are respectively opposed to the positioning hole 37 and the cartridge discrimination hole 45 provided at the tape cartridge 21.

Figure 14:
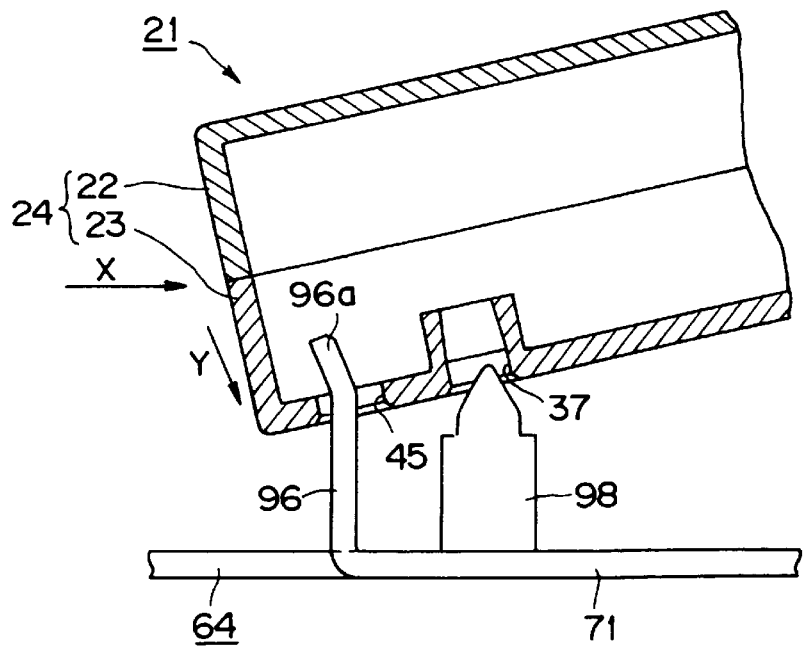
FIG. 14 is a partial side cross sectional view showing the state where cartridge discrimination piece is admitted into cartridge discrimination hole.
Figure 13:
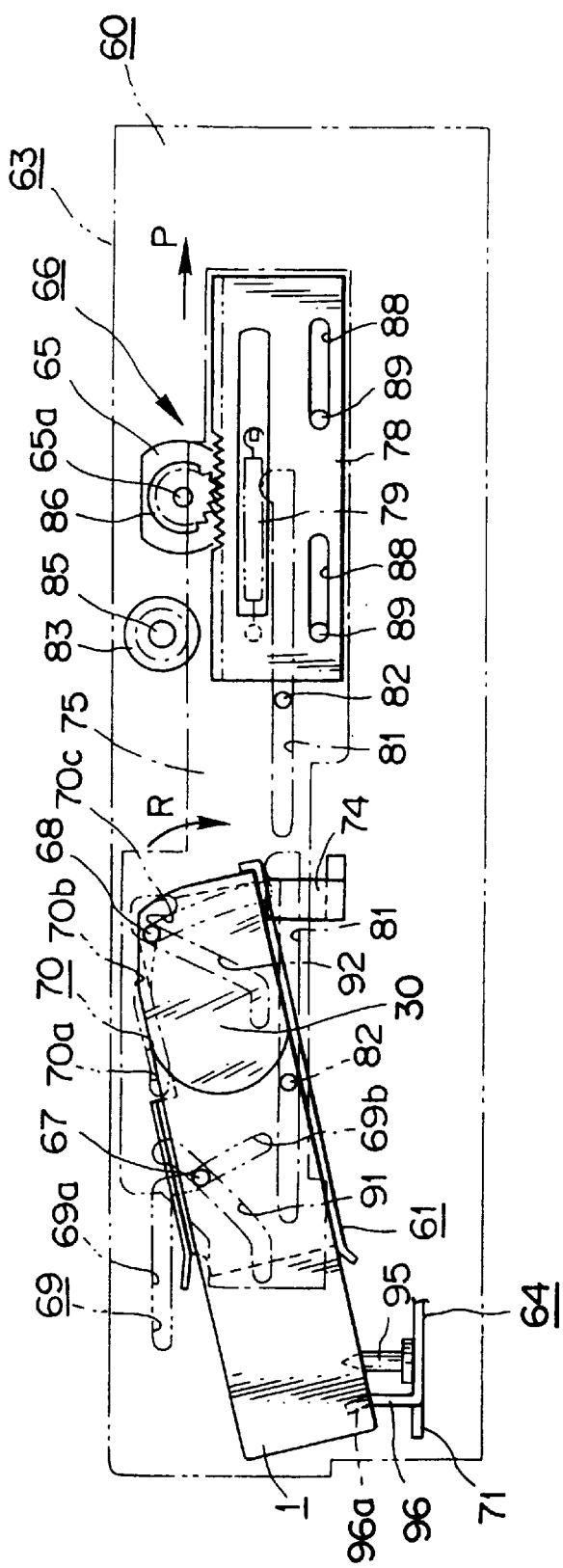
FIG. 13 is a side view of the cartridge loading unit showing the state where the cartridge holder is caused to undergo movement operation toward the cartridge loading position side so the cartridge holder is inclined.

Further, when the drive motor 65 is driven so that a pair of slide plates 75, 76 are slid in the direction indicated by arrow P in FIG. 11, one slide guide pin 67 inserted through one slide guide groove 69 arrives at the inclined guide groove 69b from the horizontal guide groove 69a as shown in FIG. 13, and is moved by the cam groove 91 provided at the slide plate 75. Thus, the slide guide pin 67 falls down to the bottom plate 71 side of the chassis 64 while being guided by the inclined guide groove 69b. At this time, since the other slide guide pin 68 is positioned at the portion extending from the horizontal guide groove 70b to the inclined guide groove 70c, the cartridge holder 61 is fluctuated with the other slide guide pin 68 being as center so that the back (rear) end side thereof is dropped down. Further, as shown in FIG. 14, the positioning pin 98 is admitted into the positioning hole 37 provided at the tape cartridge 21. As a result, the cartridge discrimination piece 96 is admitted into the cartridge discrimination hole 45. At this time, the tape cartridge 21 held by the cartridge holder 61 is rotated in such a manner to drop the lower end portion of the back (face) side down to the bottom plate 71 side of the chassis 64 in the direction indicated by arrow Y in FIG. 12. However, since the front end side of the cartridge discrimination piece 96 is caused to be the inclined portion 96a inclined along the movement locus of the tape cartridge 21, the cartridge discrimination piece 96 is smoothly admitted into the cartridge discrimination hole 45 along the movement of the tape cartridge 21.

Figure 15:
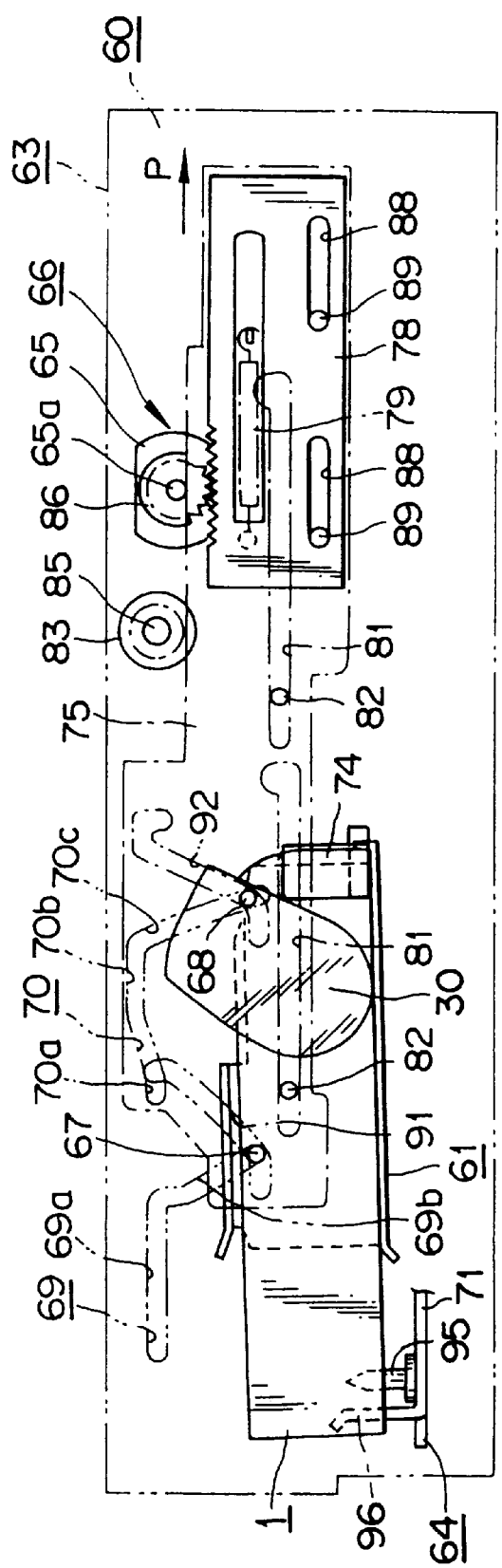
FIG. 15 is a side view of the cartridge loading unit showing the state where the cartridge holder is loaded into the cartridge loading portion in a manner caused to be substantially in a horizontal state.

When the drive motor 65 is further driven from the state shown in FIG. 13 so that the pair of slide plate 75, 76 are slid in the direction indicated by arrow P in FIG. 13, the slide guide pins 67, 68 are caused to respectively undergo movement operation by the cam grooves 91, 92 as shown in FIG. 15. As a result, they are dropped down toward the bottom plate 71 side of the chassis 64 while being guided by inclined guide grooves 69b, 70c directed toward the lower direction of the respective slide guide grooves 69, 70. At this time, since the cartridge holder 61 is dropped down from the state where the front end side thereof is inclined in upper direction as shown in FIG. 13, it is dropped down in such a manner that it is rotated in the direction indicated by arrow R in FIG. 13 with one slide guide pin 67 being as center.

When the cartridge holder 61 is dropped down in such a manner that it is rotated in the direction indicated by arrow R in FIG. 13, the lower end edge of the front cover 30 of the tape cartridge 21 comes into contact with the cover opening member 74. Then, the front cover 30 is caused to undergo pressing operation with respect to the cover opening member 74 in accordance with falling of the cartridge holder 61. As a result, the front cover 30 is rotated against biasing force of the biasing member to open the front portion of the cartridge body 24. At this time, since the tape cartridge 21 has dropped down in such a manner that it is rotated with respect to the cover opening member 74, it is possible to securely carry out rotational operation of the front cover 30 rotatably attached to the cartridge body 24 by the cover opening member 74 fixedly disposed.

Moreover, when the cartridge holder 61 has dropped down in such a manner that it is rotated in the direction indicated by arrow R in FIG. 13, the reel lock releasing member 95 is admitted into the penetration hole 38 provided at the bottom surface portion of the tape cartridge 21 as shown in FIG. 15 to release the locked state of the tape reels 25, 26 by the reel lock mechanism thus to place these tape reels 25, 26 in the rotatable state.

Figure 16:
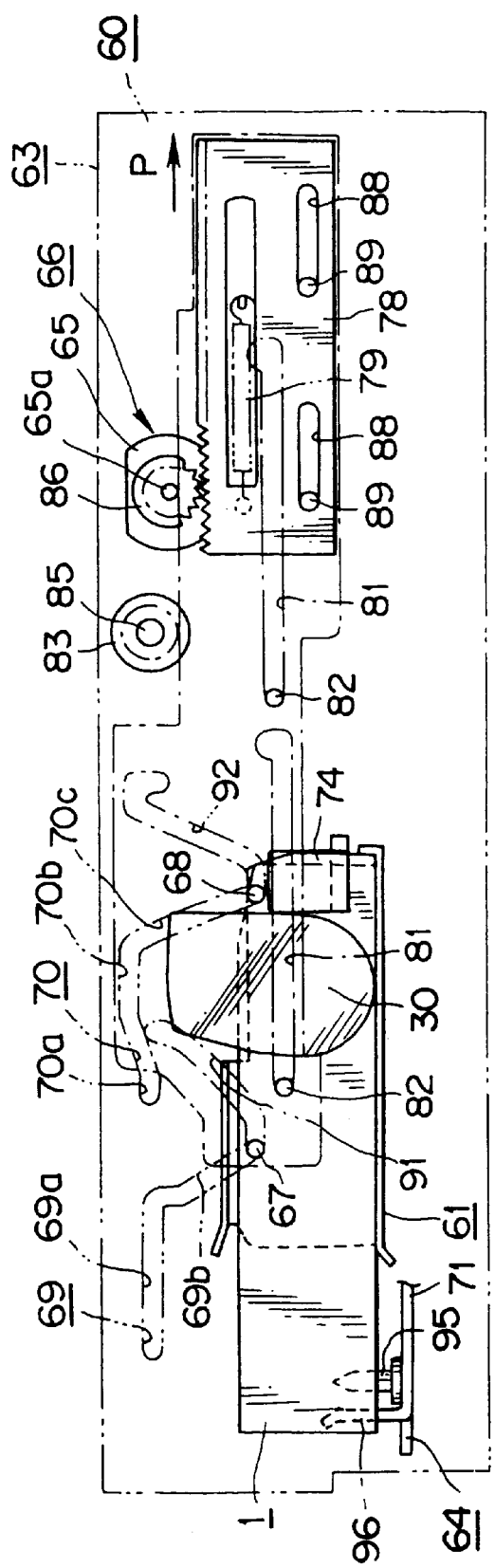
FIG. 16 is a side view showing the state where the tape cartridge is loaded into the cartridge loading portion.
Figure 17:
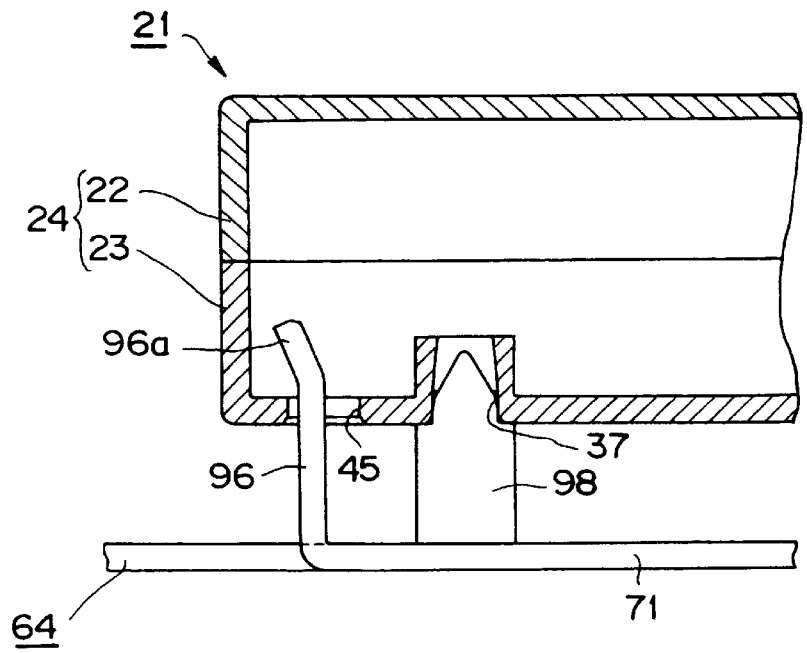
FIG. 17 is a partial side cross sectional view showing the state where the tape cartridge is loaded into the cartridge loading portion.

When the drive motor 65 is further driven in the forward rotational direction from the state shown in FIG. 15 so that the slide plates 75, 76 are slid in the direction indicated by arrow P in FIG. 15, the cartridge holder 61 is dropped to the lowermost position as shown in FIG. 16 to support the tape cartridge 21 by the height positioning pins 97, 97 and the positioning pins 98, 98 after undergone positioning to load it into the cartridge loading portion 99. At this time, the cartridge discrimination piece 96 is admitted into the cartridge body 24 through the cartridge discrimination hole 45 as shown in FIG. 17.

Moreover, when the cartridge holder 61 has dropped down to the cartridge loading portion 99, the front cover 30 of the tape cartridge 21 is rotated so that it is placed at the position where it has completely opened the front portion 13 of the cartridge body 24 by the cover opening member 74. When the tape cartridge 21 is loaded into the cartridge loading portion 99 of the drive unit, the loading mechanism provided at the drive unit is admitted into the recessed portion 35 for loading provided at the front side of the cartridge body 24 to draw the magnetic tape 27 from the cartridge body 24 to allow it to undergo loading into a predetermined tape traveling path.

Figure 18:
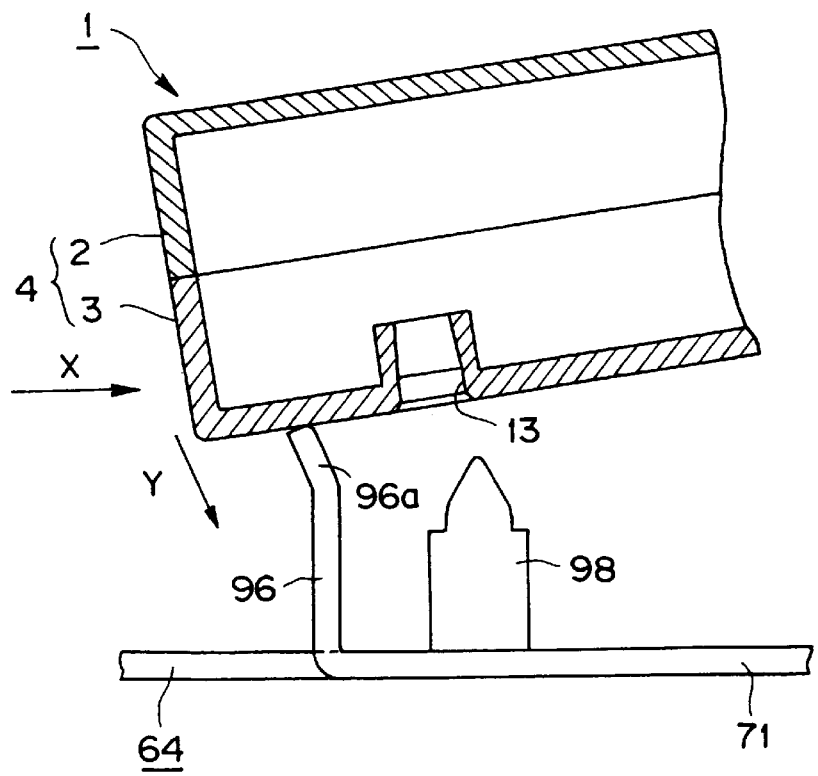
FIG. 18 is a partial side cross sectional view of the cartridge loading portion showing the state where inadequate tape cartridge is loaded.

When tape cartridge 1 used as a tape cartridge for exclusively recording video signals or speech signals which is not provided with the cartridge discrimination hole 45 as shown in FIGS. 1 and 2 is loaded into the drive unit provided with cartridge discrimination piece 96 as described above, the cartridge holder 61 is caused to undergo movement operation in the direction indicated by arrow P in FIG. 11. As a result, when the tape cartridge 1 held by the cartridge holder 61 is moved in the horizontal direction of the direction indicated by arrow X in FIG. 18, and is then rotated so as to drop the lower end portion of the back (face) side toward the bottom plate 71 side of the chassis 64 in the direction indicated by arrow Y in FIG. 18, the front end portion of the cartridge discrimination piece 96 comes into contact with the bottom surface of the cartridge body 4. Thus, further falling of the tape cartridge 1 is limited. As a result, loading into the cartridge loading portion 99 is prohibited.

At the drive unit side, a movement mechanism moved along with movement of the loaded tape cartridge is provided. By detecting movement quantity of the movement mechanism, judgment as to whether or not the loaded tape cartridge is adapted to the corresponding apparatus can be made. In the case where it is detected by the movement quantity detecting mechanism of the tape cartridge that loading of the adapted tape cartridge is not carried out, the cartridge loading unit is controlled by this detection output. Thus, ejection of the non-adapted tape cartridge is carried out. Accordingly, the cartridge discrimination piece 96 constitutes the discrimination mechanism for discriminating adaptability of the tape cartridge loaded into the corresponding apparatus.

The tape cartridge according to this invention is constituted for the purpose of realizing an implementation such that the tape cartridge is used as a recording medium of the recording and/or reproducing apparatus used as external memory unit of information processing equipment such as computer, etc. For this reason, an auxiliary memory unit provided with memory element constituted by integrated circuit element, etc. in which discrimination information which are various information such as specification, use state or recording position of the magnetic tape, or the content of recorded information signal, etc. are stored (recorded) is included within the cartridge body.

Meanwhile, it is impossible to confirm, by visual observation, the memory element included within the cartridge body. Moreover, as the memory element disposed within the cartridge body, various memory elements may be used in dependency upon the specifications of the tape cartridges. Since it is impossible to confirm, by visual observation, the memory element disposed within the cartridge body as stated above, even if no memory element is attached, or any memory element different in the memory capacity or kind from a predetermined memory element is disposed, it is extremely difficult to discriminate such a memory element. Further, when the tape cartridge is loaded into the recording and/or reproducing apparatus provided with dedicated auxiliary recording/reproduction unit corresponding to the individual specification in the state where no memory element is attached, or in the state where memory element different in the memory capacity or kind is attached, there may result an erroneous operation such that any missing takes place in recording and/or reproduction of information signals with respect to the memory element.

In view of the above, a tape cartridge of a second embodiment according to this invention is of a structure adapted for easily confirming, by visual observation, presence or absence of memory element and kind of memory element of the auxiliary memory unit included within the cartridge body 24 by utilizing the previously described cartridge discrimination hole 45, and adapted for preventing electrification (charging) of the memory element included within the cartridge body so that protection of the memory element can be made.

It is to be noted that since the second embodiment is common to the previously described first embodiment in the configuration such as cartridge body, etc., only the configuration of the essential part thereof will be described in the following explanation, and common reference numerals are respectively attached to the portions common to those of the first embodiment and their detailed description will be omitted.

Figure 19:
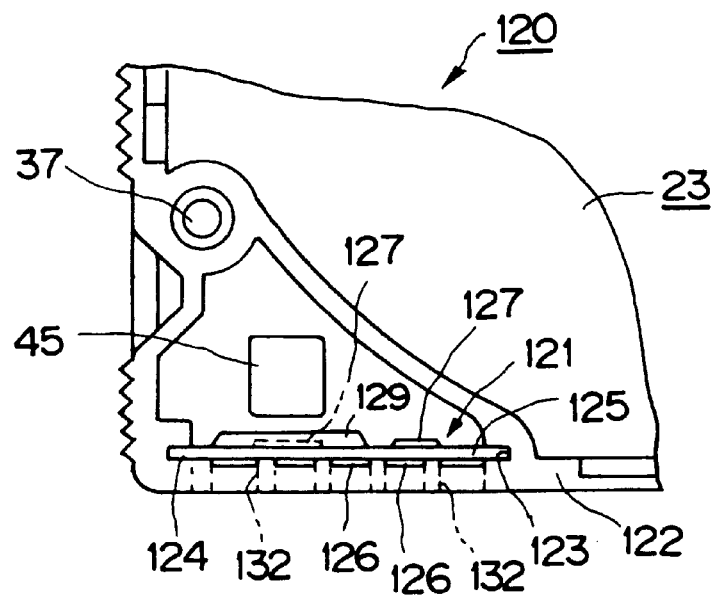
FIG. 19 is a plan view showing a second embodiment of the tape cartridge according to this invention, wherein the inside of lower half is shown in the state where auxiliary memory unit is attached.

Tape cartridge 120 of the second embodiment is adapted as shown in FIG. 19 so that an auxiliary memory unit 121 is attached at the position where visual observation can be made through cartridge discrimination hole 45 provided at the bottom surface side of the cartridge body 24. Namely, the auxiliary memory unit 121 is disposed at the other corner portion side of lower half 23 where the cartridge discrimination hole 45 is provided and along the inside surface of the back (face) wall 122 of the lower half 23. At the inside surface of a back (face) wall 122, insertion grooves 123, 124 for attaching the auxiliary memory unit 121 are provided. The auxiliary memory unit 121 is attached within the cartridge body 24 through these insertion grooves 123, 124.

Figure 20:
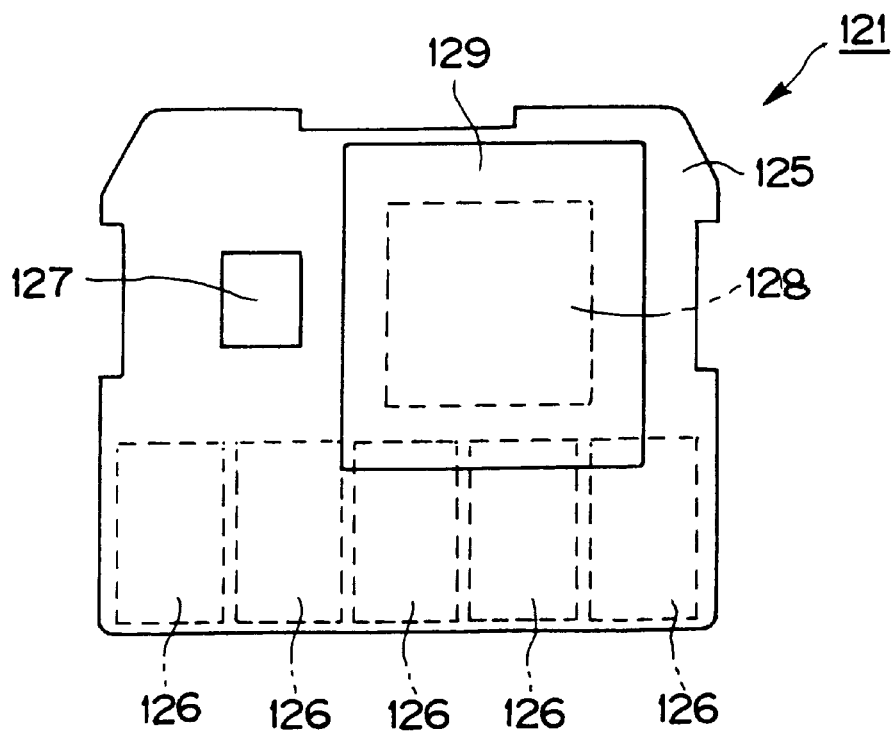
FIG. 20 is a front view showing the auxiliary memory unit attached to the tape cartridge.
Figure 21:
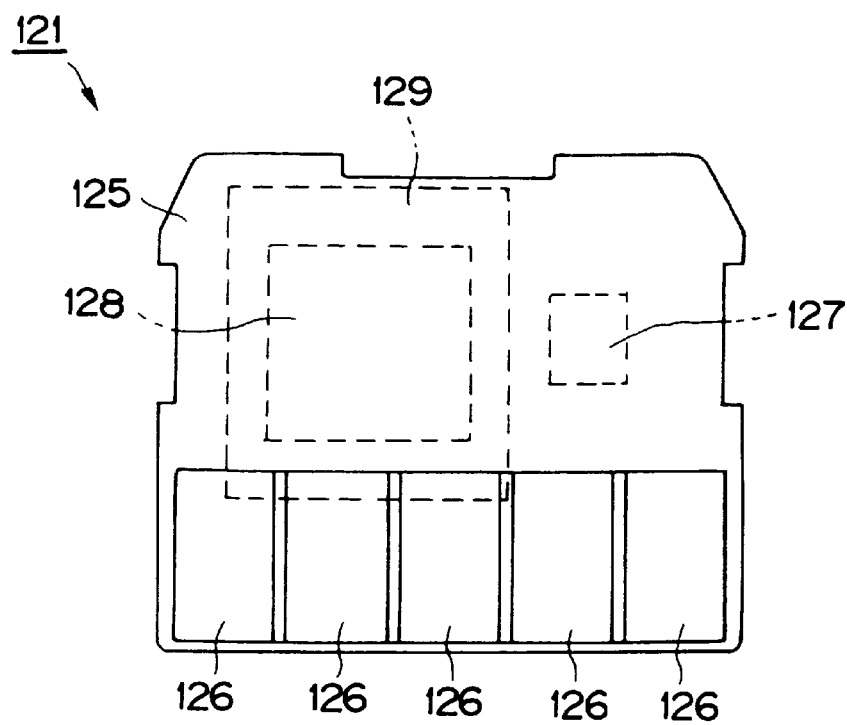
FIG. 21 is a back (face) view showing the auxiliary memory unit.

The auxiliary memory unit 121 attached to the cartridge body 24 is of the configuration comprising, as shown in FIG. 20, a wiring board 125 where wires are formed by printing on the both surfaces, a memory element 128 mounted on one surface of the wiring board 125 and a detection terminal 127 formed by printing on one surface of the wiring board 125, and further comprising plural contact terminals 126 formed by printing on the other surface of the wiring board 125, etc. as shown in FIG. 21. The auxiliary memory unit 121 is assembled into the lower half 23 as shown in FIG. 19 in such a manner that the both sides of the wiring board 125 are fitted into the insertion grooves 123, 124 in the state where the memory element 128 and the detection terminal 127 are directed toward the internal of the cartridge body 24, and the contact terminals 126 are directed toward the external of the cartridge body 24.

Figure 22:
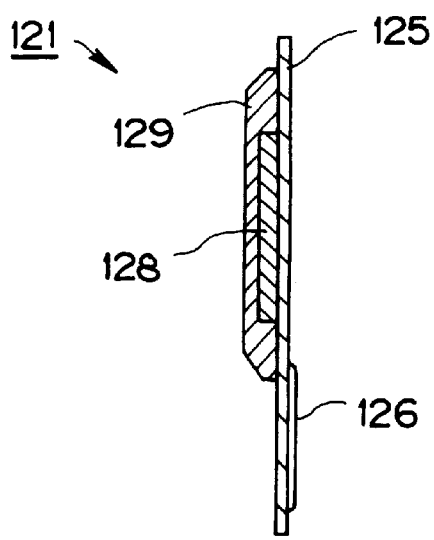
FIG. 22 is a right side view showing the auxiliary memory unit.

In the memory element 128, various discrimination information, e.g., memory capacity, the specification of the magnetic tape 27 accommodated within the tape cartridge 120, use state thereof, and the content of information signal recorded on the magnetic tape 27, etc. are stored. The entirety of the surface of the memory element 128 is covered by a protective film 129 consisting of synthetic resin material as shown in FIG. 22. On the surface of the protective film 129, discrimination content such as memory capacity and/or kind, etc. of the memory element 128 is described by printing or carved seal although not shown. The detection terminal 127 is electrically connected to detection pin provided at auxiliary recording/reproduction unit provided at the drive unit into which the tape cartridge 120 is loaded, and is used for detecting discrimination information such as memory capacity, etc. of the memory element 128, or discharging static electricity charged (electrified) on the memory element 128. The contact terminals 126 are caused to serve as input/output terminal of the memory element 128, and are electrically connected to connector connected to the auxiliary recording/reproduction unit.

In this auxiliary memory unit 121, discrimination information stored (recorded) in the memory element 128 is read by the auxiliary recording/reproduction unit provided at the drive unit or independent auxiliary recording/reproduction unit, and updated discrimination information is stored (recorded) into the memory element 128. Accordingly, in accordance with this tape cartridge 120, various discrimination information are utilized, whereby the use range can be greatly extended (widened). In addition, this is extremely advantageous in the case of handling a large quantity of tape cartridges.

Figure 23:
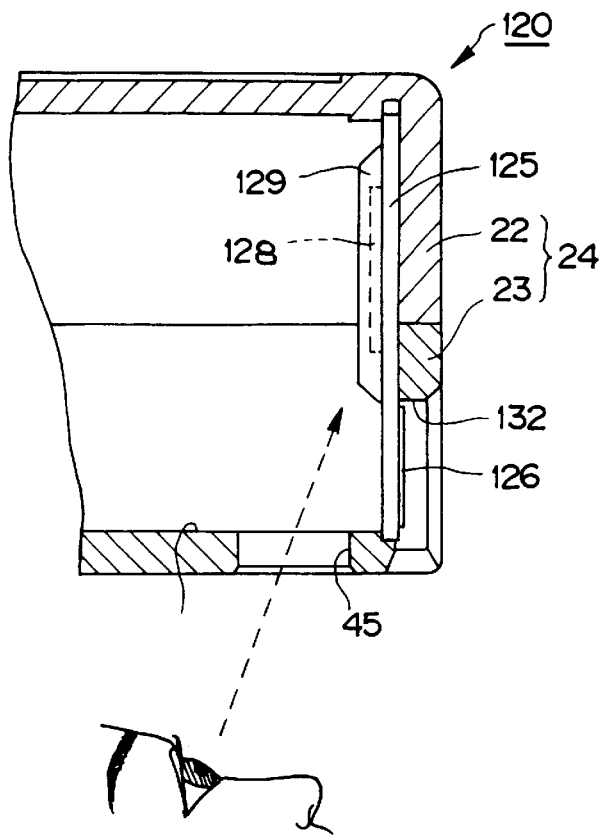
FIG. 23 is a longitudinal cross sectional view showing the tape cartridge in the state where the auxiliary memory unit is caused to undergo visual observation.
Figure 24:
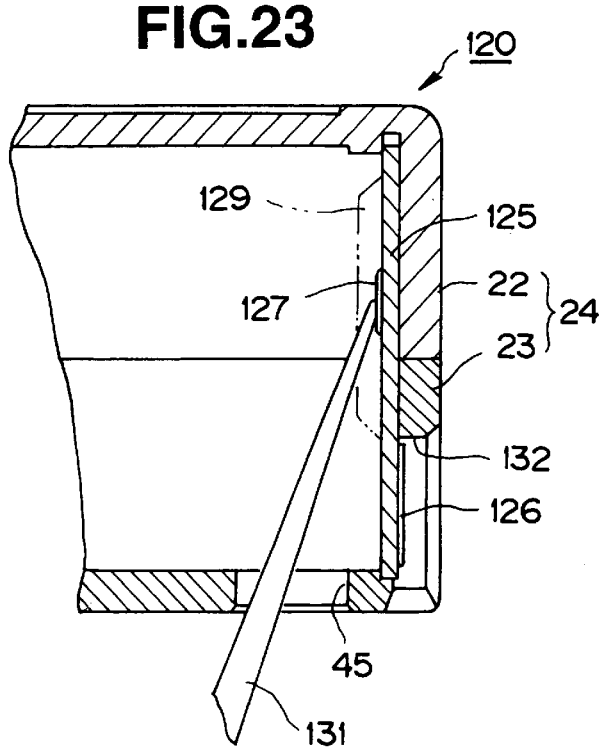
FIG. 24 is a longitudinal cross sectional view showing the tape cartridge in the state where the auxiliary memory unit is detected.

Since the auxiliary memory unit 121 is attached at the position where visual observation can be made from the cartridge discrimination hole 45 along the lower half back (face) wall 122 close to the cartridge discrimination hole 45 as stated above, it is possible to confirm, by visual observation, from the outside whether or not the auxiliary memory unit 121 is attached, as shown in FIG. 23, through the cartridge discrimination hole 45. Moreover, since the memory element 128 of the auxiliary memory unit 121 is attached, as shown in FIG. 23, in the state where the protective film 129 side to which discrimination information is implemented is directed to the internal of the cartridge body 24 opposite to the cartridge discrimination hole 45, it is possible to confirm, from the external of the cartridge body 24, the discrimination contents such as memory capacity and/or kind, etc. of the memory element 128 described on the surface of the protective film 129 by visual observation through the cartridge discrimination hole 45. In addition, insertion of detection pin 13 1 of the auxiliary recording/ reproduction unit can be made through the cartridge discrimination hole 45 as shown in FIG. 24. Accordingly, the detection pin 131 is inserted into the cartridge body 24 through the cartridge discrimination hole 45, thereby making it possible to connect it to the detection terminal 127 of the auxiliary memory unit 121. By (electrical) contact with the detection terminal 127 of the detection pin 131, discharge of static electricity electrified on the memory element 128 is carried out. Thus, protection of the memory element 128 is realized.

Figure 25:
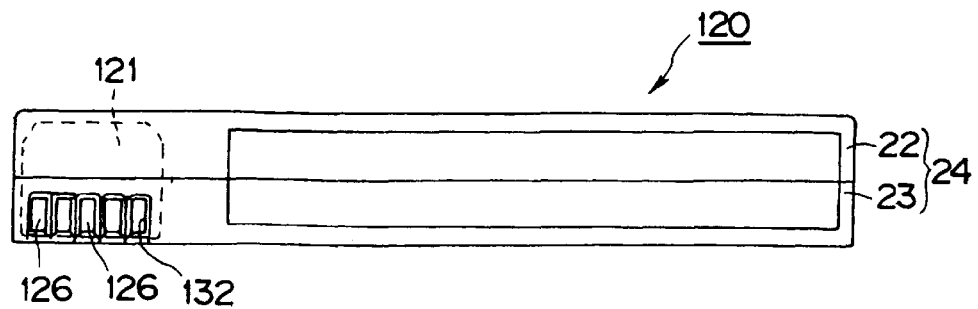
FIG. 25 is a back (face) view showing the tape cartridge.

Further, at the back (face) wall 122 of the lower half 23, a contact terminal opening portion 132 is provided as shown in FIG. 25. The contact terminal opening portion 132 is formed as a rectangular opening bored at the back surface wall 122. This contact terminal opening portion 132 is adapted so that the contact terminals 126 of the auxiliary memory unit 121 attached at the inside surface of the back (face) wall 122 of the lower half 23 are faced toward the external.

As stated above, in accordance with the tape cartridge 120 of the second embodiment, confirmation by visual observation of the auxiliary memory unit 121 included within the cartridge body 24 can be precisely realized. As a result, electrification (charging) of the memory element 128 of the auxiliary memory unit 121 can be prevented. Not only recording and/or reproduction of discrimination information with respect to the memory element 128 can be carried out, but also protection of the memory element 128 can be realized.

It is to be noted that as long as the auxiliary memory unit 121 is provided at the position where visual observation can be made through the cartridge discrimination hole 45, it may be provided not only at the back (face) wall 122 side of the cartridge body 24, but also on the inside surface of the side surface wall perpendicular to the back (face) wall 122 or the outer circumferential surface of the reel limiting wall surrounding the tape reel.

In the tape cartridge provided with the auxiliary memory unit like the above-described tape cartridge of the second embodiment, it is desirable to realize (carry out) protection of the auxiliary memory unit and connection terminals to which the auxiliary recording/reproduction unit is electrically connected, which are disposed at the recording and/or reproducing apparatus side.

In view of the above, in the following third embodiment, a tape cartridge including a cartridge discrimination hole, and provided with a mechanism adapted for realizing (carrying out) protection of the auxiliary memory unit and the connection terminal(s) of the recording and/or reproducing apparatus side to which the auxiliary memory unit is electrically connected will now be described.

Tape cartridge 201 of the third embodiment is adapted so that a magnetic tape 207 of which tape width is caused to be 8 mm is accommodated therewithin. Further, the tape cartridge 201 of this embodiment is a tape cartridge used as the recording medium of information processing equipment such as computer, etc., and is constituted so as to have sufficiently large recording (memory) capacity as compared to the tape recorder cartridge for video tape recorder used for exclusively carrying out recording of video signals or speech signals.

The tape cartridge 201 constituted as a tape cartridge for recording data signals is formed in the state where its external shape is caused to be substantially in correspondence with the tape cartridge 1 for video tape recorder within which the previously described magnetic tape 7 having tape width caused to be 8 mm, which is constituted as a tape cartridge for exclusively recording video signals or speech signals shown in FIGS. 1 and 2, is accommodated. Namely, the tape cartridge 201 of this embodiment and the tape cartridge 1 for video tape recorder are formed so that they are common in the width, the length and the thickness.

Figure 26:
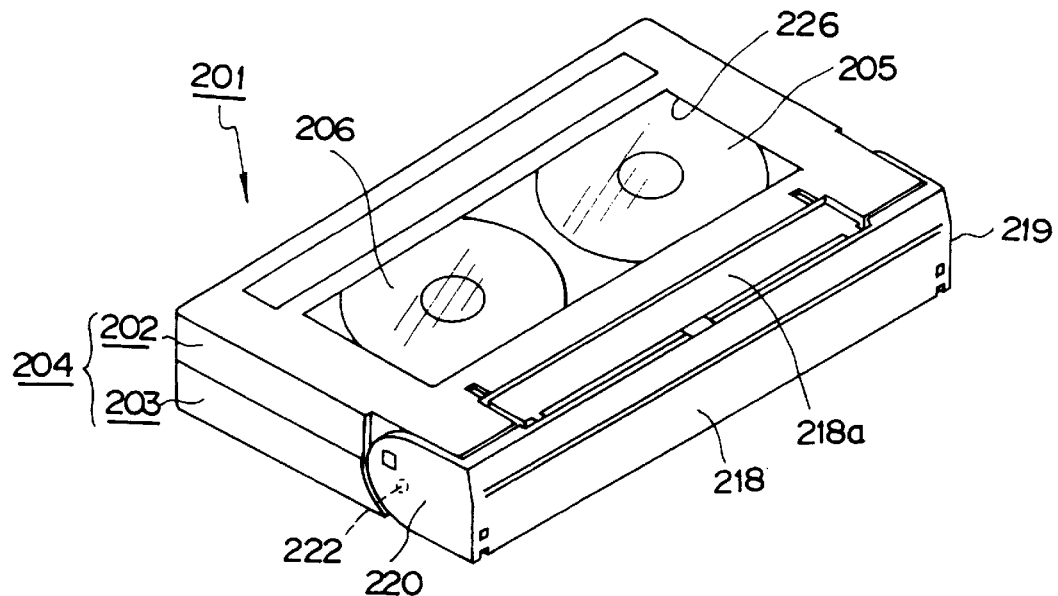
FIG. 26 is a perspective view showing a tape cartridge of a third embodiment according to this invention.
Figure 27:
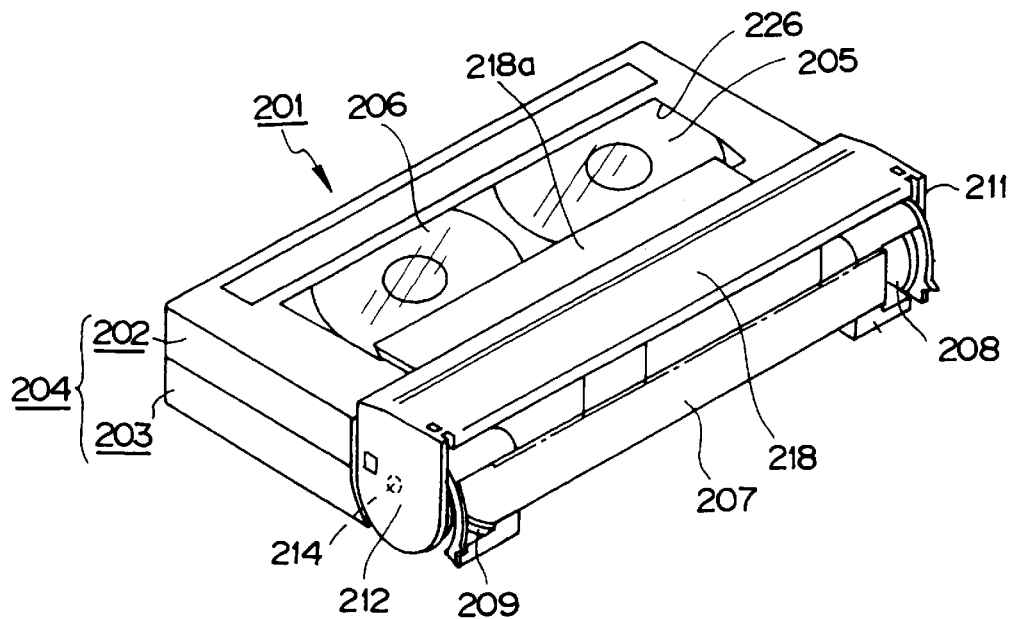
FIG. 27 is a perspective view showing the state where front cover is opened in the tape cartridge.

The tape cartridge 201 of the third embodiment includes, as shown in FIGS. 26 and 27, a cartridge body 204 in which a pair of upper and lower halves 202, 203 are butt-joined similarly to the tape cartridge 1 for video tape recorder, wherein a pair of tape reels 205, 206 are rotatably supported within the cartridge body 204. Between these tape reels 205 and 206, the magnetic tape 207 is wound. As such magnetic tape 207, there is used a magnetic tape having the specification capable of recording data signals handled in information processing equipment such as computer, etc. with sufficiently large recording (memory) capacity in the state where satisfactory recording characteristic is maintained.

As shown in FIG. 27, the magnetic tape 207 wound across the pair of tape reels 205, 206 is drawn out toward the external of the cartridge body 204 through tape drawing opening portions 208, 209 provided on the both sides of the front side of the cartridge body 204, and is caused to undergo traveling operation within the range between the pair of tape reels 205, 206.

Figure 28:
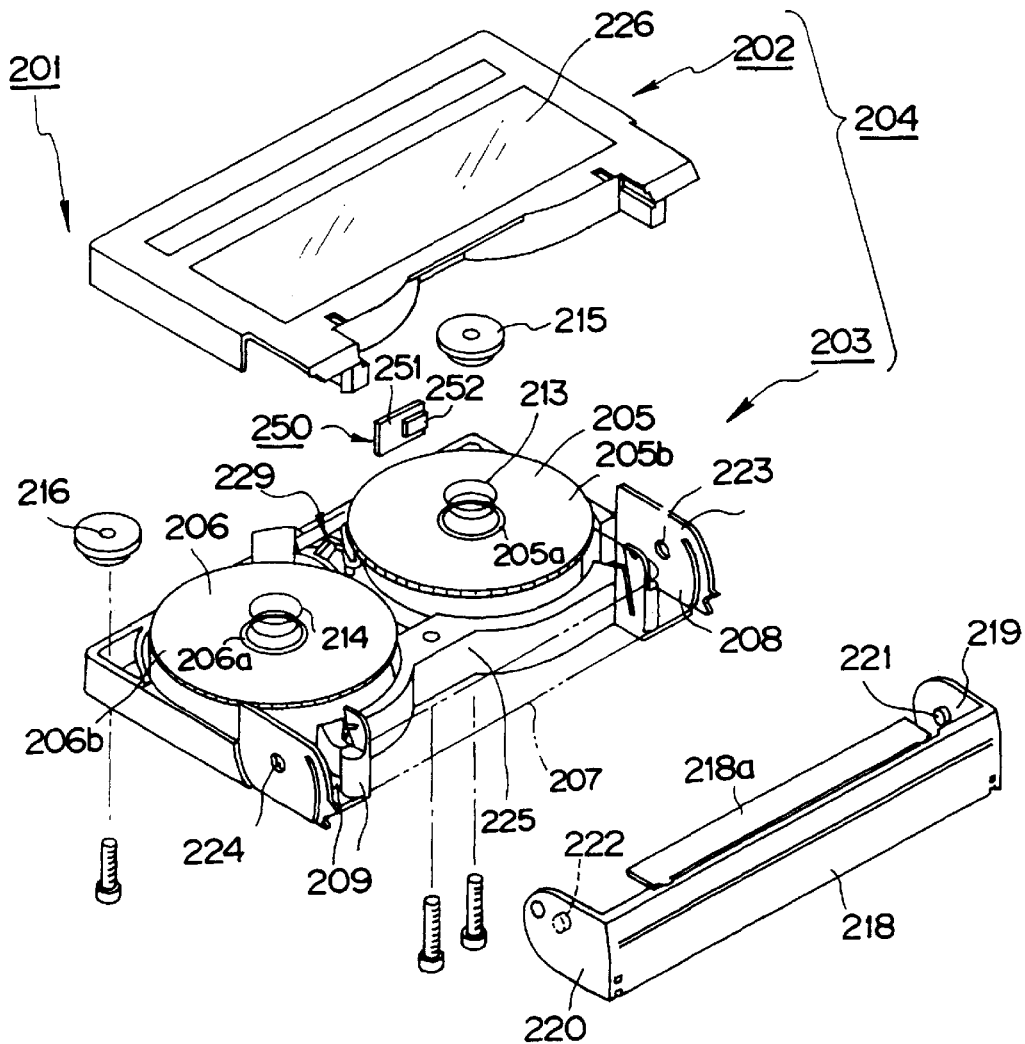
FIG. 28 is an exploded perspective view of the tape cartridge.

The tape reels 205, 206 on which the magnetic tape 207 is wound are composed, as shown in FIG. 28, of cylindrical hub portions 205a, 206a, and disc-shaped flange portions 205b, 206b integrally attached to the both ends of these hub portions 205a, 206a. These tape reels 205, 206 are rotatably supported within the cartridge body 204 in the state where the lower end portions of the hub portions 205a, 206a are engaged (fitted) into reel drive shaft insertion holes 211, 212 bored at the lower half 203. These tape reels 205, 206 are adapted so that the upper end sides of the hub portions 205a, 206a are supported in such a manner that they are pressed to the lower half 203 side by reel holding springs 213, 214 and reel holding members 215, 216 disposed at the internal surface side of the upper half 202. The tape reels 205, 206 are pressure-supported by the reel holding springs 213, 214 and the reel holding members 215, 216 so that stable rotation can be guaranteed within the cartridge body 204.

Further, the magnetic tape 207 is connected between (laid across) a pair of tape reels 205, 206 in the state where the both ends thereof are respectively supported by a damper (not shown) at the hub portions 205a, 206a.

At the front side of the cartridge body 204, a front cover 218 which covers the magnetic tape 207 drawn out toward the front side of the cartridge body 204 is rotatably attached. As shown in FIG. 28, this front cover 218 is adapted so that supporting pins 221, 222 projected on the inside surface of rotational pieces 219, 220 projected in a manner opposite to each other on the both sides thereof are inserted through insertion holes 223, 224 bored at the front end side of the both sides of the lower half 203. Thus, the front cover 218 is rotationally operated, with the supporting pins 221, 222 being as center, between the position shown in FIG. 26 where it closes the front side of the cartridge body 204 and the position shown in FIG. 27 where it opens the front side. This front cover 218 is rotationally operated to thereby open or close the front side of the cartridge body 204. In this example, an upper cover 218a which covers a portion of the upper surface side of the cartridge body 204 is attached at the front cover 218 so that it is synchronously rotated.

Figure 29:
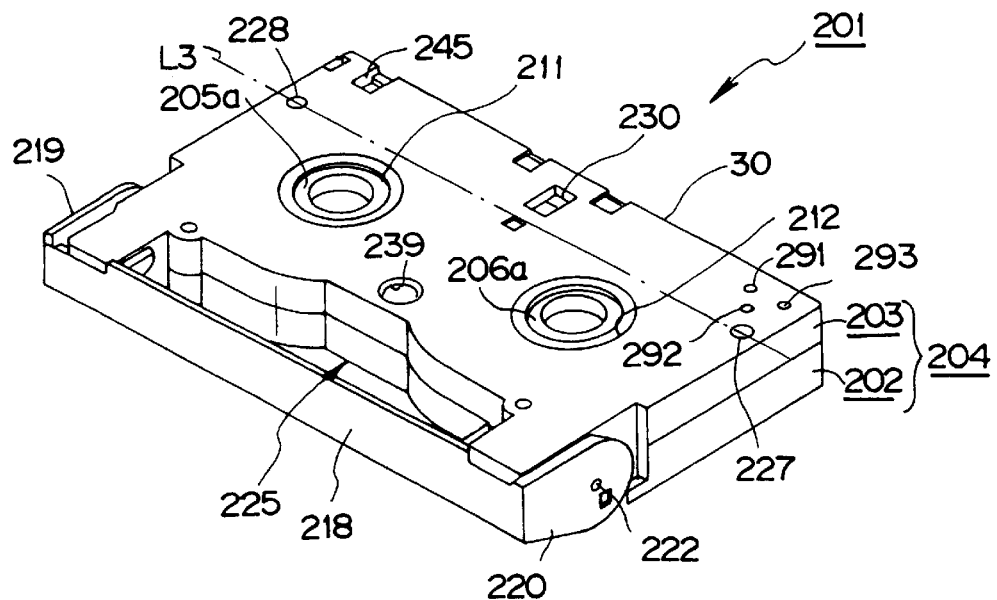
FIG. 29 is a perspective view showing, from the bottom surface side, the tape cartridge.

At the front side covered by the front cover 218 of the cartridge body 204, as shown in FIGS. 28 and 29, there is provided a recessed portion 225 into which a loading mechanism for drawing the magnetic tape 207 from the cartridge body 204 to allow it to undergo loading into the tape traveling path within the recording and/or reproducing apparatus (unit) is admitted.

Moreover, at the upper surface side of the cartridge body 204, there is provided a rectangular see-through window 226 which permits visual observation of the state of the magnetic tape 207 wound across the pair of tape reels 205, 206.

Further, at the bottom surface side of the cartridge body 204, as shown in FIG. 29, there are provided reel drive shaft insertion holes 211, 212 adapted for facing the hub portions 205a, 206a provided at the central portions of the tape reels 205, 206 toward the external, and through which there are inserted reel drive shafts engaged with the hub portions 205a, 206a to rotationally operate the tape reels 205, 206. Further, at the bottom surface side of the cartridge body 204 and on the both sides of the back (face) side opposite to the front side where the front cover 218 is attached, there are provided positioning holes 227, 228 adapted so that when the tape cartridge 201 is loaded into the recording and/or reproducing apparatus, positioning pins provided at the apparatus side are engaged with the positioning holes to carry out positioning of the loading position. Moreover, at the bottom surface side of the cartridge body 204, as shown in FIG. 29, there is provided an operation hole 230 of the reel lock mechanism positioned at the central portion of the back (face) side and adapted so that the operation portion of a reel lock mechanism 229 to limit free rotation of the tape reels 205, 206 is faced thereto. The reel lock releasing member provided at the apparatus side is admitted into the operation hole 230 when the tape cartridge 201 is loaded into the recording and/or reproducing apparatus to allow the reel lock mechanism 229 to undergo movement operation to thereby release lock state of the tape reels 205, 206.

Figure 31:
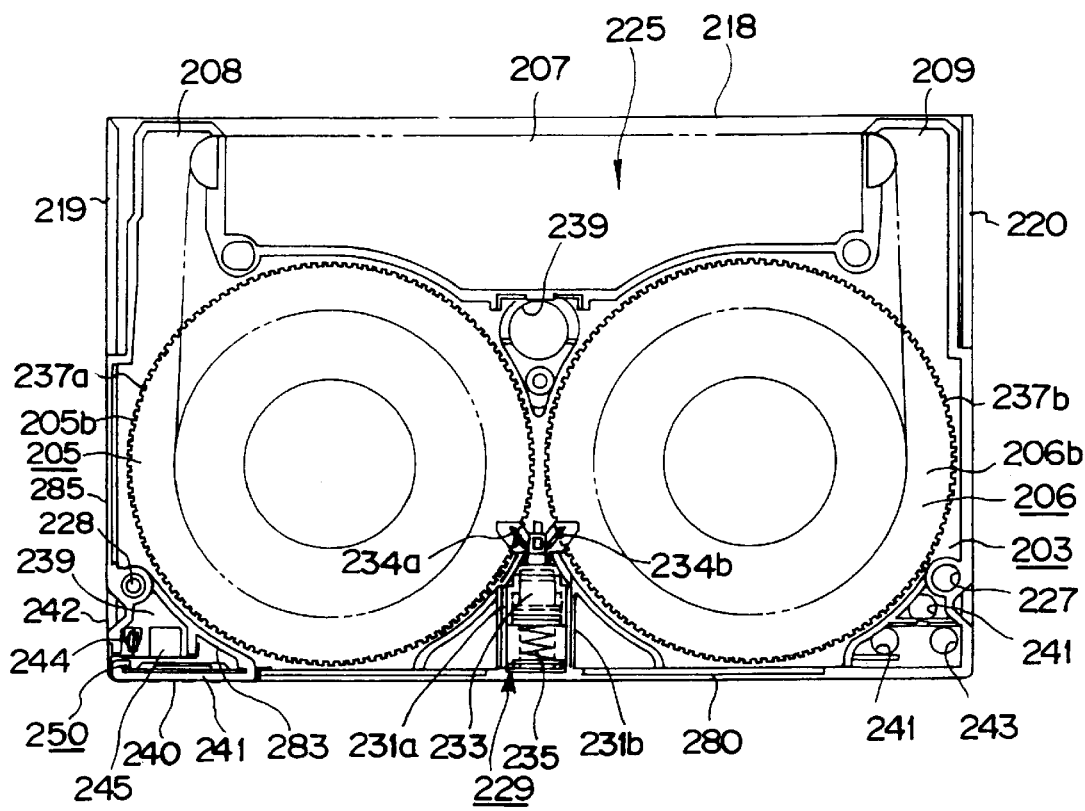
FIG. 31 is a plan view showing the state where upper half of the tape cartridge is detached.

The reel lock mechanism 229 for locking the tape reels 205, 206 in the state they are unable to rotate for the purpose of preventing that the tape reels 205, 206 rotate so that unprepared drawing of the magnetic tape 207 is carried out when the tape cartridge 210 is not loaded into the recording and/or reproducing apparatus is disposed at the central portion of the back (face) side of the lower half 203 as shown in FIG. 31, and is composed of a pair of engagement pawls 234a, 234b engaged with engagement teeth 237a formed at the outer circumferential edges of flange portions 205b, 206b provided at the lower sides of the respective tape reels 205, 206, a movement member 233 adapted for rotatably supporting these engagement pawls 234a, 234b, and a coil spring 235 for biasing the movement member 233 toward the tape reels 205, 206 side. The movement member 233 is attached, so that it can be moved, between guide walls 231a, 231b in parallel to each other, which are positioned between the pair of tape reels 205, 206 and are vertically provided on the bottom surface of the lower half 203, and a working (operation) portion (not shown) faced to the external in the state penetrated through an operation hole 230 bored at the bottom surface of the lower half 203 is integrally formed. The reel lock mechanism 229 is adapted so that when the tape cartridge 201 is loaded into the recording and/or reproducing apparatus, the operation member provided at the recording and/or reproducing apparatus side is inserted through the operation hole 230 to allow the movement member 233 to undergo movement operation toward the back (face) side of the cartridge body 204 against biasing force of the coil spring 235 to thereby withdraw the respective engagement pawls 234a, 234b from the state where they are engaged with the engagement teeth 237a, 237b of the respective tape reels 205, 206 to release the lock state of the tape reels 205, 206 to place them in rotatable state.

Furthermore, at the bottom surface side of the cartridge body 204, as shown in FIGS. 29 and 31, there is provided a light emitting element insertion hole 239 positioned at the central portion of the front side and adapted so that a light emitting element which constitutes terminating end detection mechanism for detecting the terminating end of the magnetic tape 207 provided at the recording and/or reproducing apparatus side is inserted.

Meanwhile, in the tape cartridge 201 of this embodiment, at the bottom surface side of the cartridge body 204 and in the state positioned at one corner portion of the back (face) side close to the positioning holes 227, 228, as shown in FIG. 29, two tape discrimination holes 291, 292 indicating the specification such as thickness and/or kind, etc. of the magnetic tape 207 accommodated within the tape cartridge 21 and a single erroneous recording prevention hole 293 are provided. In this instance, the tape specification discrimination holes 291, 292 indicate that the magnetic tape 207 accommodated within the tape cartridge 201 is a magnetic tape in which there is provided a magnetic recording medium having thickness including magnetic layer which permits recording of data signals and corresponding to the magnetic head of the recording and/or reproducing apparatus for carrying out recording of data signals. In addition, in the tape cartridge 201, the erroneous recording prevention hole 293 is ordinarily placed in the state where recording of data signals can be made with respect to the magnetic tape 207. Namely, the erroneous recording prevention hole 293 is in the closed state.

Moreover, at the bottom surface side of the cartridge body 204 and at the other corner portion of the back (face) side close to the positioning hole 228, as shown in FIG. 29, there is provided a discrimination hole 245 of the tape cartridge indicating that this tape cartridge 201 is a data recording tape cartridge and adapted so that an erroneous loading prohibiting member which prohibits erroneous loading of the tape cartridge provided at the side of the recording and/or reproducing apparatus into which the tape cartridge 201 is loaded is engaged with the discrimination hole 245. This discrimination hole 245 is formed so as to take a rectangular shape which is larger than the tape specification discrimination holes 291, 292. Further, the discrimination hole 245 is provided at the position corresponding to the area where three tape specification discrimination holes 15 provided at the other corner portion of the bottom surface side of the previously described tape recorder cartridge for video tape recorder are not provided. By providing the discrimination hole 245 at such a position, even in the case where the tape cartridge 201 of this embodiment is loaded into the video tape recorder in which the tape cartridge 1 constituted as shown in FIGS. 1 and 2 is exclusively used, detection of the discrimination hole 245 by detecting means for detecting the tape specification discrimination hole 15 provided at the other corner portion of the tape cartridge 1 provided at the video tape recorder side is limited. Accordingly, in the tape cartridge 201 of this embodiment, since when loaded into the video tape recorder, it is prevented that the discrimination hole 245 is detected by the tape specification detecting means of the video tape recorder side, it becomes possible to use such tape cartridge also as the recording medium for video tape recorder.

Further, also in the tape cartridge 201 of this embodiment, similarly to the previously described tape cartridge 1, positioning holes 227, 228, tape specification discrimination holes 291, 292, erroneous recording prevention hole 293, and discrimination hole 245 are provided in the state positioned at the outer circumferential sides of the tape reels 205, 206 accommodated within the cartridge body 204. Namely, they are provided in the state positioned at the outer circumferential side of the maximum winding diameter of the magnetic tape 207 wound on the tape reels 205, 206. Further, as shown in FIG. 29, the tape specification discrimination holes 291, 292, the erroneous recording prevention hole 293 and the discrimination hole 245 are provided in the state positioned at the back (face) side of the cartridge body 204 relative to line $L_3$ connecting centers of the positioning holes 227, 228 provided on the both sides of the cartridge body 204. By providing the respective holes 291, 292, 293 and 245 in this way, it is possible to prevent traveling of the magnetic tape 207 from being impeded by detecting means of the recording and/or reproducing apparatus side for detecting the state of these holes 291, 292, 293 and 245. Thus, reliable detection of the state of respective holes 291, 292, 293 and 245 by the detecting means can be made.

In the tape cartridge 201 of the third embodiment, an auxiliary memory unit 250 comprising memory element constituted by integrated circuit element, etc. in which discrimination information which are various information such as specification, use state or recording position of the magnetic tape 207, or content of recorded information signal, etc. are stored (recorded) is included within the cartridge body 204.

In the auxiliary memory unit 250, discrimination information stored (recorded) in the memory element 252 comprised of integrated circuit element, etc. is read through connector 267 which will be described later by the auxiliary recording/reproduction unit provided in the recording and/or reproducing unit 260 into which the tape cartridge 201 is loaded, or auxiliary recording/reproduction unit independent of the unit for carrying out recording of data signals with respect to the magnetic tape 207, and updated discrimination information is stored (recorded) into the memory element 252.

Figure 30:
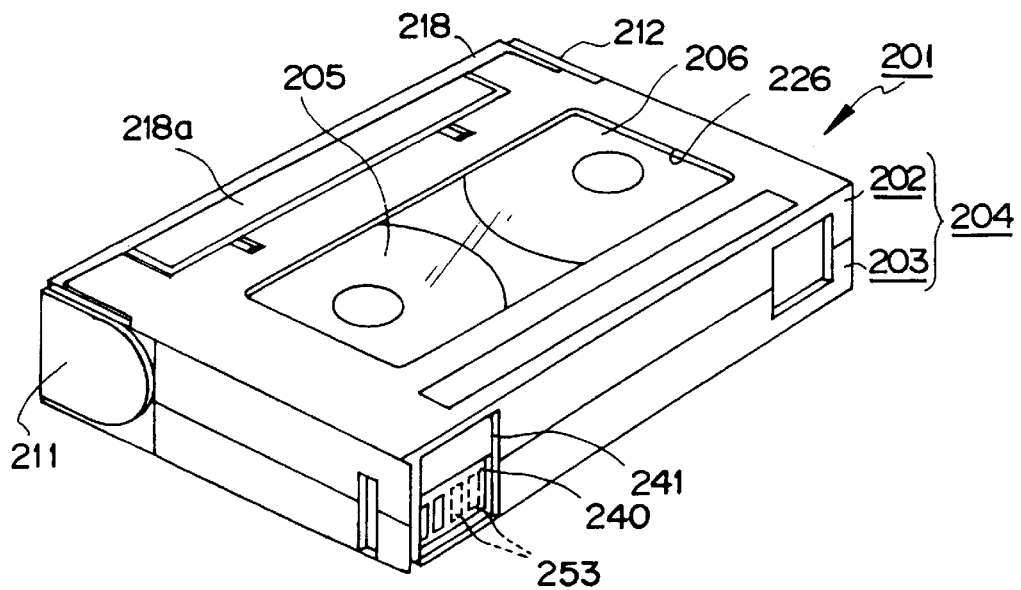
FIG. 30 is a perspective view showing, from the back (face) side, the tape cartridge.

As shown in FIGS. 28 and 30, the auxiliary memory unit 250 included within the tape cartridge 201 is composed of at least a wiring board 251, a memory element 252 mounted on the wiring board 251; and plural contact terminals 253 formed on the wiring board 251 serving as input/output terminals of the memory element 252. The wiring board 251 is constituted as the so-called double-sided printed wiring board. As described later, in the state where the wiring board 251 is assembled into the cartridge body 204, the memory element 252 is mounted (assembled) on one principal surface side facing toward the internal of the cartridge body 204 and contact terminals 253 are formed by printing on the other principal surface side opposite to the back (face) side.

Figure 32:
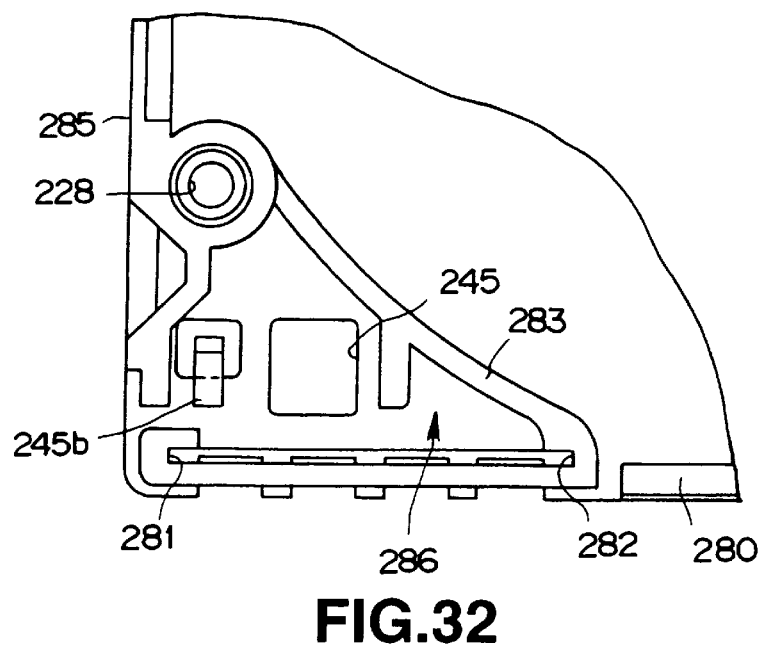
FIG. 32 is an essential part enlarged plan view showing lower half in the state where upper half is detached in the tape cartridge.
Figure 33:
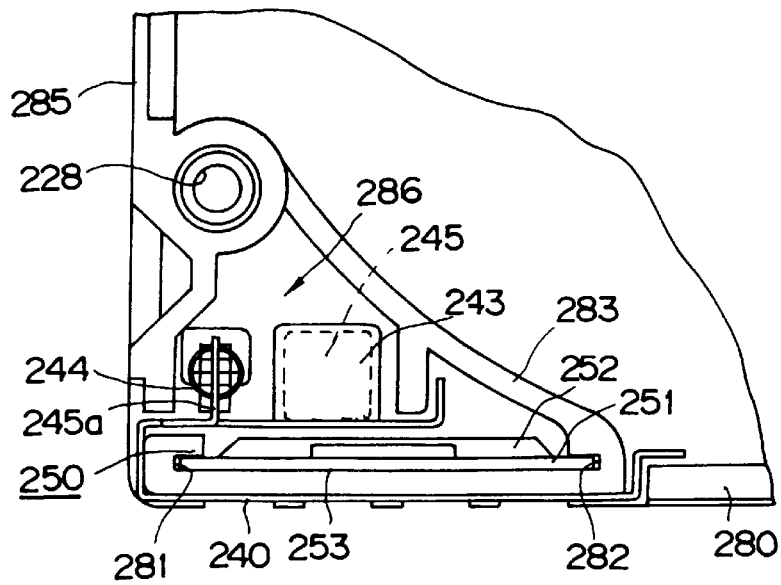
FIG. 33 is an essential part enlarged plan view showing the state where auxiliary memory unit is attached to the lower half in the tape cartridge.

As shown in FIG. 31, this auxiliary memory unit 250 is disposed at the other corner portion side of the lower half 203 in which the cartridge discrimination hole 245 is provided and along the inside surface of the back (face) wall 280 of the lower half 203. At the inside surface of the back (face) wall 280, as shown in FIGS. 32 and 33, insertion grooves 281, 282 for attaching the auxiliary memory unit 250 are provided. The auxiliary memory unit 250 is attached within the cartridge body 204 through these insertion grooves 281, 282. The auxiliary memory unit 250 is adapted so that when attached into the cartridge body 204, the contact terminals 253 are faced (toward the external) through the terminal opening portion 241 bored at the back (face) wall 280 as shown in FIG. 30. Namely, as shown in FIGS. 32 and 33, the cartridge discrimination hole 245 is bored at the bottom portion within a substantially triangular space portion 286 constituted by a reel guide wall 283 rising-formed from the bottom surface portion of the lower half 203 and rising-formed along the outer circumferential edge of the tape reel 205, back (face) wall 280 constituting the outer circumferential wall of the cartridge body 204, and a side wall 285 perpendicular to the back (face) wall. Further, the auxiliary memory unit 250 is disposed along the inside surface of the back (face) wall 280 close to the cartridge discrimination hole 245.

In this example, the terminal opening portion 241 provided at the back (face) wall 280 of the lower half 203 is formed so as to take a rectangular shape having dimensions sufficient to face the contact terminals 253 of the auxiliary memory unit 250 toward the external.

Further, the auxiliary memory unit 250 is assembled into the cartridge body 204 in the state where both sides of the wiring board 251 are fitted into the insertion grooves 281, 282 in such a manner that the memory element 252 is positioned inside and the contact terminals 253 are faced from the terminal opening portion 241 toward the external. Between the contact terminals 253 and the terminal opening portion 241, a shutter member 240 is disposed as shown in FIGS. 30 and 31. This shutter member 240 is formed as a rectangular member having dimensions sufficient to close the terminal opening portion 241. As shown in FIG. 33, a working (operation) portion 243 bent toward the forward side along the bottom surface portion of the lower half 203 is integrally provided at the lower end portion. Moreover, a spring hook piece 245a is integrally formed at the back (face) portion of the upper end portion side of the shutter member 240. Further, a spring hook piece 245b is integrally formed in a projected manner on the bottom surface of the lower half 203 as shown in FIG. 32. Between the spring hook piece 245a of the shutter member 240 and the spring hook piece 245b of the lower half 4, an extension spring 244 is stretched. The shutter member 240 is biased toward the bottom surface portion side of the lower half 203 by elastic force of the extension spring 244 and ordinarily closes the terminal opening portion 241.

On the other hand, at the bottom surface of the lower half 203 constituting the cartridge body 204, as shown in FIG. 32, there is bored cartridge discrimination hole 245 substantially rectangular in cross section in the state positioned in a manner opposite to the working portion 243 of the shutter member 240. This cartridge discrimination hole 245 is of a structure in which it has an inside dimension slightly greater than the outside dimension of cartridge discrimination piece 266 which will be described later of the side of the recording and/or reproducing apparatus 260 into which the tape cartridge 210 of this embodiment is loaded, and taper is provided at the opening edge side of the lower half 203 so that fitting operation with respect to the cartridge discrimination piece 266 of the recording and/or reproducing unit 260 side is smoothly carried out. Moreover, this cartridge discrimination hole 245 is closed by the working portion 243 of the shutter member 240 when the tape cartridge is not used. On the other hand, when the tape cartridge 201 is loaded into the recording and/or reproducing apparatus 260, the cartridge discrimination hole 245 is placed in the opened state as the result of the fact that the working portion 243 is pressed with respect to the cartridge discrimination piece 266 of the recording and/or reproducing apparatus 260 side. Further, this cartridge discrimination hole 245 allows the recording and/or reproducing apparatus 260 to discriminate that the loading tape cartridge is the tape cartridge 201 of the specification in which the auxiliary memory unit 250 is mounted.

Figure 34:
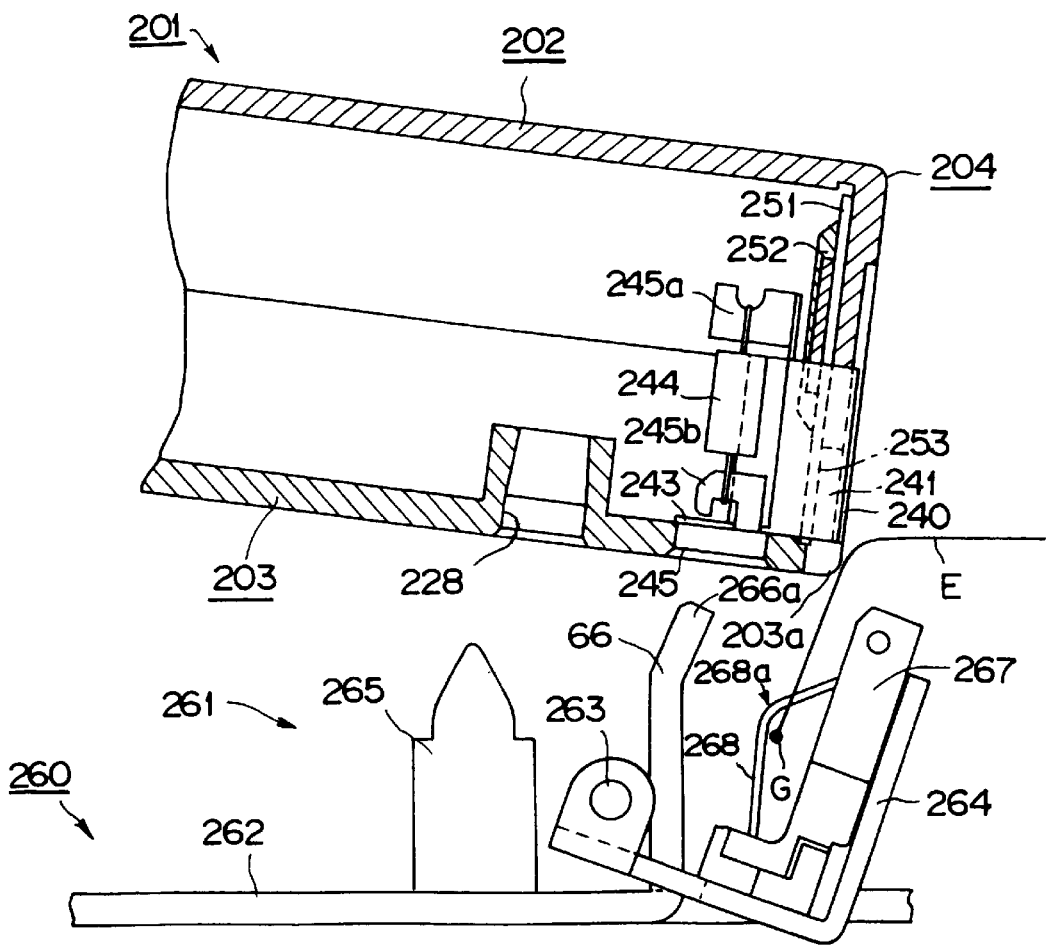
FIG. 34 is an essential part longitudinal cross sectional side view showing, for explanation, operation to load the tape cartridge into recording and/or reproducing apparatus.

When inserted into the recording and/or reproducing apparatus 260 through the cartridge loading/withdrawal hole, the tape cartridge 201 of the third embodiment constituted as described above is loaded into the cartridge loading portion 261 provided within the recording and/or reproducing apparatus 260. The loading portion 261 of the recording and/or reproducing apparatus 260 side is constituted on the chassis 262. On this chassis 262, as shown in FIG. 34, there is provided a connection terminal mechanism 264 substantially L-shaped in cross section in which the front end portion thereof is rotatably supported through a support shaft 263. On the chassis 262, a positioning pin 265 is vertically provided in correspondence with the positioning hole 228 of the loaded tape cartridge 201, and a cartridge discrimination piece 266 is vertically provided in correspondence with the cartridge discrimination hole 245 of the tape cartridge 201. The front end portion of the positioning pin 265 is formed in a substantially circular cone shape. Thus, fitting operation with respect to the positioning hole 228 is smoothly carried out. Further, the cartridge discrimination piece 266 is formed as an inclined portion 266a of which front end portion is bent so as to take dog leg shape. Thus, admitting operation with respect to the cartridge discrimination hole 245 is smoothly carried out. In addition, this cartridge discrimination piece 266 detects the cartridge discrimination hole 245 of the tape cartridge 201 side to discriminate this cartridge from the previously described tape cartridge 1 for exclusively carrying out recording of video signals, etc., which is not provided with a contact terminal.

Figure 35:
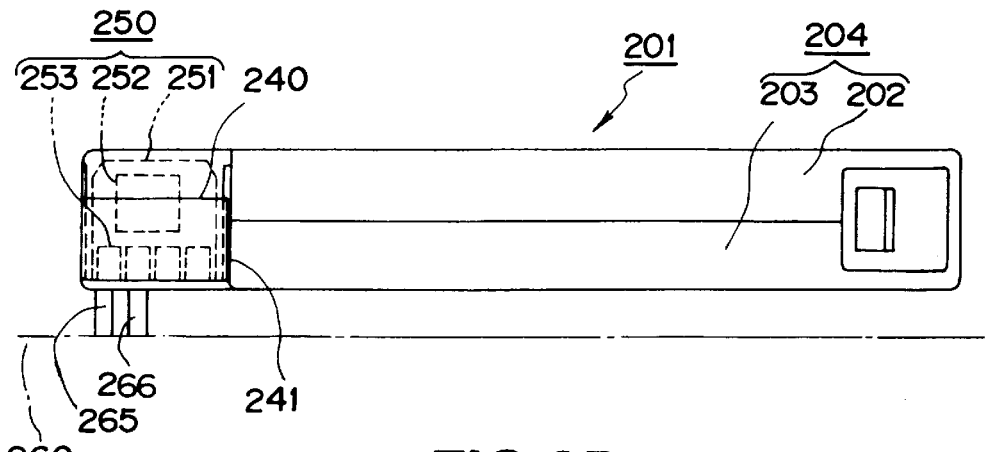
FIG. 35 is a back (face) view for showing, for explanation, operation to load the tape cartridge into the recording and/or reproducing apparatus.

The connection terminal mechanism 264 is adapted as shown in FIGS. 34 and 35 so that in the state where the tape cartridge 201 is not loaded, the connector 267 and the lower end portion 203a of the back (face) side of the lower half 203 are brought into the state evaded to the position where they do not collide with each other as shown in FIG. 34. At the connection terminal mechanism 264, the connector 267 is disposed in correspondence with the terminal opening portion 241 of the loaded tape cartridge 201. The connector 267 is connected to the auxiliary recording/reproduction unit for carrying out reproduction of discrimination information stored in the memory element 252 and for allowing the memory element 252 to store updated discrimination information thereinto.

Further, at the connector 267, there are provided connection terminals 268 formed by elastically displaceable metallic member having conductivity which is admitted from the terminal opening portion 241 to come into contact with the contact terminal 253 of the auxiliary memory unit 250 in the state where the tape cartridge 201 is loaded into the cartridge loading portion 261 of the recording and/or reproducing apparatus 260. At the connection terminal 268, there is formed a contact portion 268a in a manner bent so as to take substantially dog leg shape, which is in contact with the contact terminal 253 of the tape cartridge 201. The connection terminal 268 is adapted so that in the state where the connection terminal mechanism 264 is evaded as described above, the height from the surface of the chassis 262 up to the contact portion 268a is caused to be lower than the height from the surface of the chassis 262 up to the front end portion of the cartridge discrimination piece 266. Namely, the connection terminal 268 is adapted so that when the front end portion of the cartridge discrimination piece 266 is admitted into the cartridge discrimination hole 245 of the tape cartridge 201, the contact portion 268a is placed in the state where it does not collide with the lower end portion 203a of the tape cartridge 201.

Figure 36:
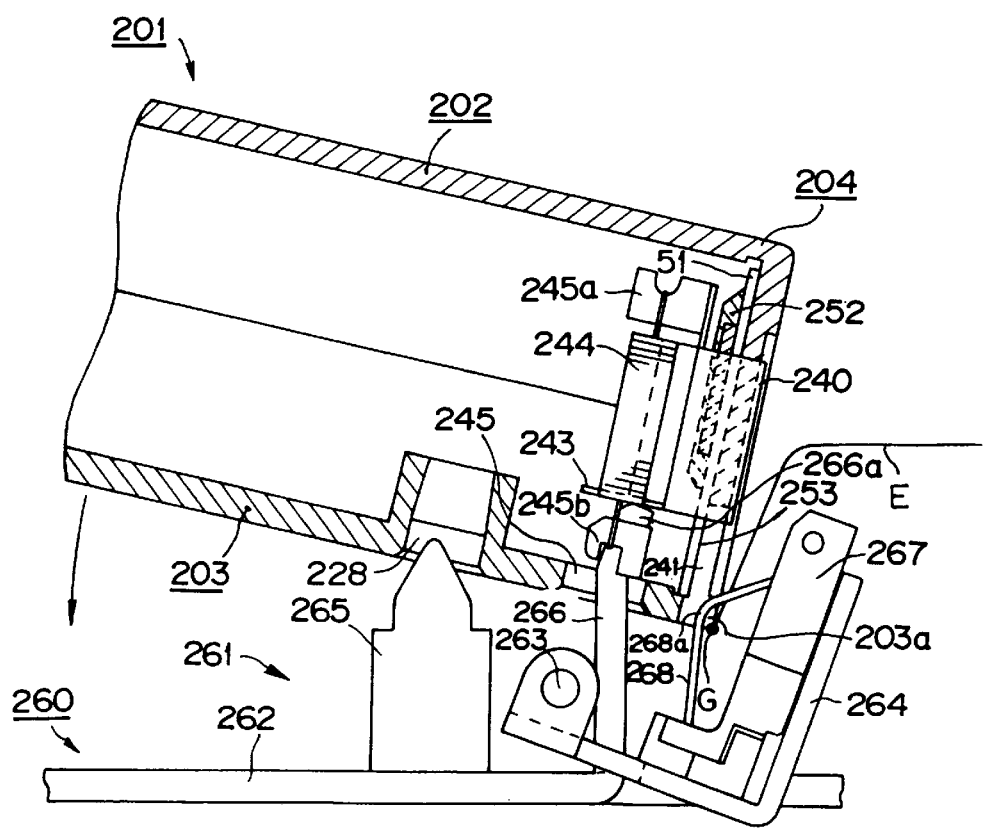
FIG. 36 is an essential part longitudinal cross sectional side view showing, for explanation, operation to load the tape cartridge into the recording and/or reproducing apparatus.

The tape cartridge 201 is adapted as shown in FIGS. 35 and 36 so that when it carries out falling operation down to the loading portion 261 of the recording and/or reproducing apparatus 260, the lower end portion 203a is caused to undergo movement operation through the locus E shown in FIG. 36. Loading of the tape cartridge 201 is detected as the result of the fact that the cartridge discrimination piece 266 of the recording and/or reproducing unit 260 side is admitted into the cartridge discrimination hole 245. In this instance, the cartridge discrimination hole 245 serves as a discrimination hole of the tape cartridge 201 of the specification in which the auxiliary memory unit is mounted.

Moreover, the tape cartridge 201 is adapted so that the cartridge discrimination piece 266 of the recording and/or reproducing apparatus 260 side is further admitted into the cartridge discrimination hole 245, so it is struck against the working portion 243 so that it is pressed in the upper direction. As shown in FIG. 36, the shutter member 240 is caused to undergo movement operation in the upper direction along the back (face) wall 280 of the cartridge body 204 against elastic force of the extension spring 244 by the pressing operation of the cartridge discrimination piece 266. In this instance, the tape cartridge 201 is caused to be in the state where the contact terminals 253 of the auxiliary memory unit 250 are not in contact with the contact portion 268a of the contact terminal 268 provided at the connector 267.

Figure 37:
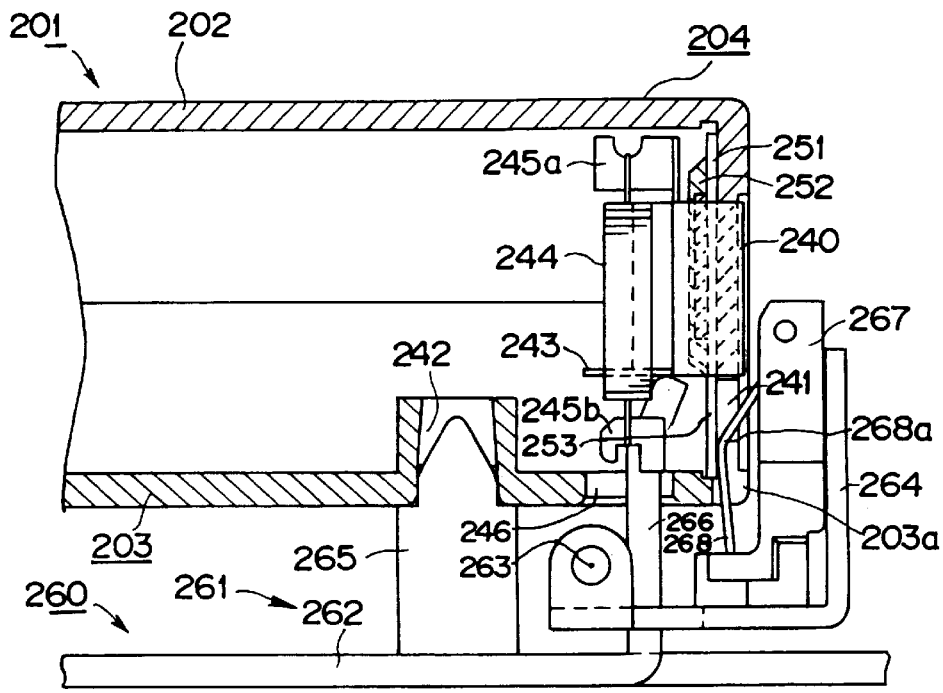
FIG. 37 is an essential part longitudinal cross sectional side view showing, for explanation, the state where the tape cartridge is loaded into the recording and/or reproducing apparatus and connection terminals are connected to connector.
Figure 38:
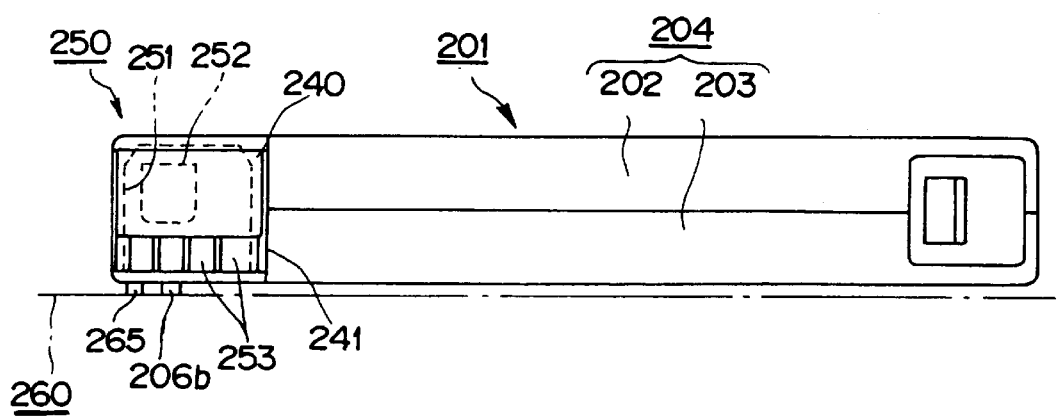
FIG. 38 is a back (face) view showing, for explanation, the state where the connection terminal of the tape cartridge is connected to the connector.

Thus, the tape cartridge 201 is adapted so that when the lower end portion 203a is caused to undergo movement operation down to the position of the point G shown in FIG. 36, the shutter member 240 is positioned at the upper side of the terminal opening portion 241 as shown in FIGS. 37 and 38, thus placing these contact terminals 253 from the state where they are closed to the state where they are exposed to the terminal opening portion 241.

The tape cartridge 201 is adapted as shown in FIG. 37 so that the positioning pin 265 of the recording and/or reproducing apparatus 260 side is relatively engaged with the positioning hole 228 provided at the side surface portion of the lower half 203, whereby the tape cartridge 201 is loaded into the cartridge loading portion 261 of the recording and/or reproducing apparatus 260 in the state where it has been caused to undergo positioning. Further, the tape cartridge 201 is adapted so that in the state loaded into the cartridge loading portion 261 of the recording and/or reproducing apparatus 260, it is admitted from the terminal opening portion 241 toward the side of the connection terminal 268 provided at the connector 267. Thus, the contact terminals 253 of the auxiliary memory unit 250 are caused to be in contact therewith.

On the other hand, when the tape cartridge 201 is loaded into the recording and/or reproducing apparatus 260, the front cover 218 is caused to undergo rotational operation in a direction to open the front side of the cartridge body 204 by cover opening means (not shown) of the recording and/or reproducing apparatus 260 side, and the reel drive shafts of the recording and/or reproducing apparatus 260 side are admitted into the reel drive shaft insertion holes 211, 212 to become engagement with the hub portions 205a, 206a of the respective tape reels 205, 206. Further, in the tape cartridge 201, the above-described reel lock mechanism 229 is operated, whereby lock state of the respective tape reels 205, 206 is released.

Accordingly, as shown in FIG. 37, in the tape cartridge 201, the front side of the cartridge body 204 is opened so that the magnetic tape 207 extended toward the front side is faced to the external. Thereafter, in the tape cartridge 201, the loading mechanism of the recording and/or reproducing apparatus 260 side is admitted into the recessed portion 225 of the front side of the cartridge body 204 to draw the magnetic tape 207 from the cartridge body 204. Thus, loading operation into a predetermined traveling path is carried out.

In the above-described embodiment tape cartridge 201, since the cartridge discrimination hole 245 is provided at the bottom surface of the lower half 203, when the tape cartridge 201 is loaded into the recording and/or reproducing apparatus 260, the cartridge discrimination piece 266 of the recording and/or reproducing apparatus 260 side is admitted into the cartridge discrimination hole 245. Thus, it is detected that corresponding tape cartridge is the tape cartridge 201 provided with the cartridge discrimination hole 245 to allow the recording and/or reproducing apparatus 260 to easily discriminate that the corresponding tape cartridge is the tape cartridge 201 of the specification in which the auxiliary memory unit 250 is mounted.

Moreover, in the case of this tape cartridge 201, since the shutter member 240 is caused to undergo movement operation by admission of the cartridge discrimination piece 266 to shift the contact terminals 253 from the closed state to the opened state, there is no possibility that the connection terminal 268 of the connector 267 of the recording and/or reproducing apparatus 260 side connected to the contact terminals 253 may collide with the shutter member 240 so that it is broken. Thus, the connection terminal 268 is securely connected to the contact terminal 253.

Further, as the result of the fact that the positioning hole 228 and the positioning pin 265 are relatively engaged with each other so that the tape cartridge 201 is loaded into the cartridge loading portion 261 of the recording and/or reproducing apparatus 260 in the state caused to undergo positioning, the connection terminals 268 of corresponding connector 267 and the contact terminals 253 are caused to be respectively in contact with each other with good accuracy. Accordingly, in the case of this tape cartridge 201, even if the terminal spacing of the contact terminals 253 is very small, connection to the connection terminals 268 of the connector 267 is precisely carried out. Thus, improvement in the reliability can be made. Further, in this tape cartridge 201, in the case where reading operation of discrimination information of the auxiliary memory unit 250 is carried out by the auxiliary recording/reproduction unit constituted independent of the recording and/or reproducing apparatus 260, high accuracy reading operation or recording operation is carried out.

In this example, the reading operation of discrimination information by the auxiliary recording/reproduction unit is carried out preceding (prior) to the above-described reproducing operation of the magnetic tape 207 or independently. Accordingly, necessary information relating to the tape cartridge 201 is grasped in advance at the recording and/or reproducing apparatus 260 side without carrying out recording/reproducing operation of the magnetic tape 207. In the case of this tape cartridge 201, when recording/reproducing operation is completed, discrimination information updated through the auxiliary recording/reproduction unit is stored into the memory element 252 of the auxiliary memory unit 250 through the connector 267 electrically connected to the contact terminals 253.

Figure 39:
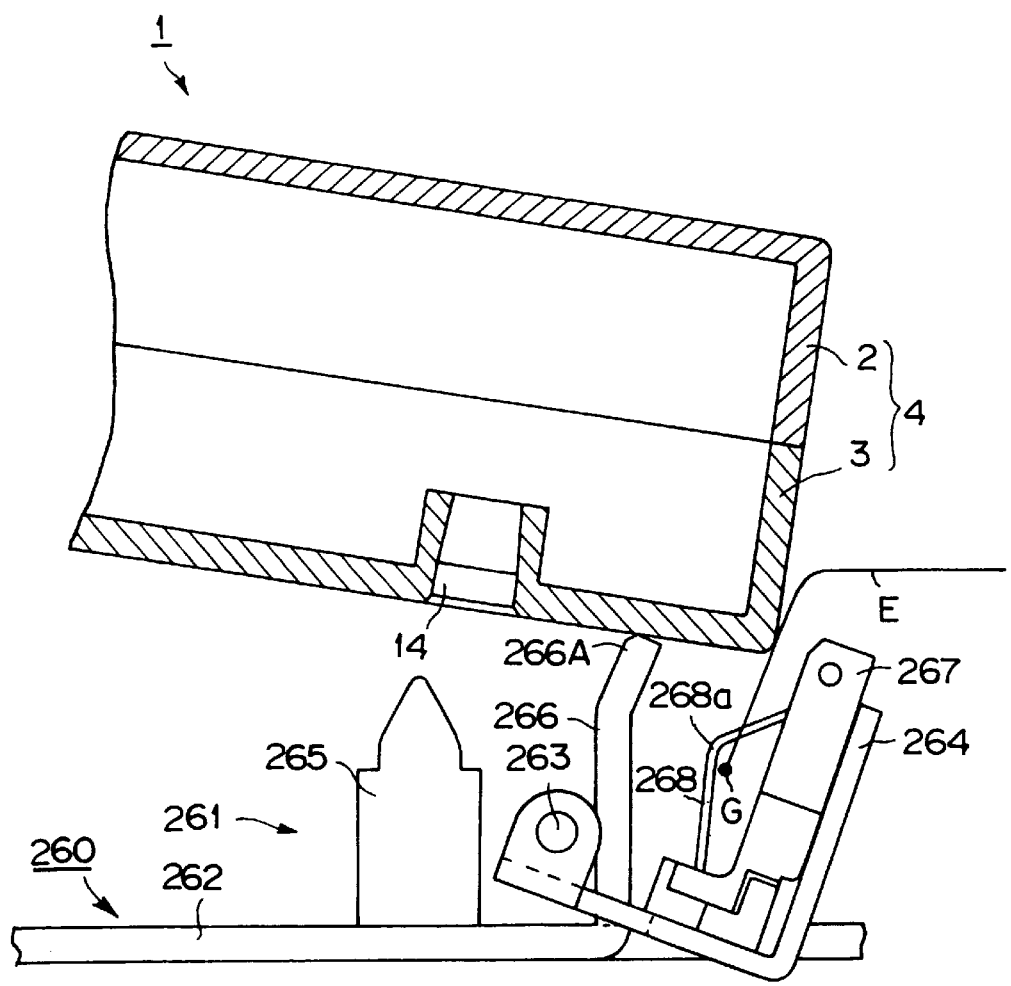
FIG. 39 is an essential part longitudinal cross sectional side view showing, for explanation, the state where tape cartridge is erroneously loaded.

Moreover, in the above-described recording and/or reproducing apparatus 260, when tape cartridge 1 which is not provided with the auxiliary memory unit 250 attempts to be loaded into the cartridge loading portion 261, since cartridge discrimination hole 245 is not provided at the ordinary tape cartridge 1 as shown in FIG. 39, the cartridge discrimination piece 266 comes into contact with the bottom surface portion of the ordinary tape cartridge 1. Then, the recording and/or reproducing apparatus 260 easily discriminates that the ordinary tape cartridge 1 is not the tape cartridge 201 of the specification in which the auxiliary memory unit 250 is mounted to stop the loading operation. Accordingly, in this recording and/or reproducing apparatus 260, the cartridge discrimination piece 266 detects the cartridge discrimination hole 245 of the tape cartridge 201 side, whereby discrimination between the tape cartridge 201 in which the auxiliary memory unit 250 is mounted and the tape cartridge 1 in which the auxiliary memory unit 250 is not mounted is easily carried out. Thus, erroneous loading with respect to the tape cartridge 1 in which no auxiliary memory unit is mounted is prevented.

Further, in the case of this recording and/or reproducing apparatus 260, the connector 267 and the connection terminal 268 are fixed at the position where they do not collide with the lower end portion of the ordinary tape cartridge 1 in the state where the front end portion of the cartridge discrimination piece 266 is in contact with the bottom surface of the ordinary tape cartridge 1, whereby the connector 267 and the contact terminal 268 are protected from colliding with the ordinary tape cartridge 1 so that they are broken.

It is to be noted that while explanation has been given in connection with the tape cartridge provided with the magnetic tape having width of 8 mm in the above-described respective embodiments, it is a matter of course that this invention can be applied also to tape cartridges provided with magnetic tapes of other specifications, and/or cartridges within which disc-shaped recording medium such as optical disc or floppy disc, etc., or the like is accommodated. Further, memory means for discrimination information constituting the auxiliary memory unit may be also constituted by other memory elements except for memory element comprised of integrated circuit element. In addition, the auxiliary recording/reproduction unit is not only constituted as a unit different from the recording and/or reproducing apparatus as described above, but also may be provided at rack unit, etc. for accommodating a large number of tape cartridges.

INDUSTRIAL APPLICABILITY

Since the tape cartridge and the recording and/or reproducing apparatus in which such tape cartridge is used as the recording medium comprise discrimination means and discrimination mechanism for discriminating whether or not loaded tape cartridge is adapted to corresponding apparatus, it is possible to securely prevent erroneous loading of the tape.

Particularly, it is possible to securely carry out protection of the tape cartridge including, within the cartridge body, memory element in which discrimination information which are various information such as specification, use state and/or recording position of the magnetic tape, and/or content of recorded information signal, etc. are stored (recorded), with a view to realizing an implementation such that tape cartridge as described above is used as a recording medium of the recording and/or reproducing apparatus used as an external memory unit of information processing equipment such as computer, etc. In addition, it is possible to realize protection of the recording and/or reproducing apparatus adapted so that such tape cartridge is loaded thereinto.

What is claimed is:

1. A recording medium device including a cartridge body within which a tape-shaped recording medium on which information signals are recorded is accommodated, wherein a bottom surface side of the cartridge body contains a cartridge discriminating opening positioned in the vicinity of a corner portion of a back side opposite to a front side of the cartridge body from which the tape-shaped recording medium is drawn out, and wherein an auxiliary memory unit in which information recorded onto the recording medium and/or information relating to the recording medium is stored and said auxiliary memory unit is disposed at a position where visual observation can be made of the auxiliary memory unit through the cartridge discrimination opening formed in the cartridge body.

2. The recording medium device as set forth in claim 1, wherein the cartridge discrimination opening is positioned at the back side of the cartridge body relative to a line connecting centers of a pair of positioning openings for carrying out positioning of a loading position with said positioning openings provided at the bottom surface side of the cartridge body.

3. The recording medium device as set forth in claim 1, wherein the cartridge discrimination opening is positioned at an outer circumferential position of tape reels on which the tape-shaped recording medium is wound within the cartridge body.

4. The recording medium device as set forth in claim 1, wherein plural recording medium specification discrimination openings indicating a specification of the recording medium are provided at the bottom surface side of the cartridge body and at one corner portion of the back side of the cartridge body, and the cartridge discrimination opening is provided at the other corner portion of the back side of the cartridge body.

5. The recording medium device as set forth in claim 1, wherein the cartridge discrimination opening is formed in a rectangular shape.

6. The recording medium device as set forth in claim 1, wherein the auxiliary memory unit is attached at an inside surface of the back side of the cartridge body.

7. The recording medium device as set forth in claim 1, wherein the auxiliary memory unit is attached to the inside surface of the back side of the cartridge body close to the position where the cartridge discrimination opening is located.

8. The recording medium device as set forth in claim 1, wherein the cartridge discrimination opening is positioned at the back side of the cartridge body relative to a line connecting centers of a pair of positioning openings for carrying out positioning of a loading position with said cartridge positioning openings provided at the bottom surface side of the cartridge body.

9. A recording and/or reproducing apparatus including a recording medium loading portion into which a recording medium device is loaded, the recording medium device comprising;

a cartridge body within which a tape-shaped recording medium on which information signals are recorded is accommodated, with said cartridge body having a cartridge discrimination opening provided at a bottom surface side of the cartridge body and positioned in a vicinity of a corner portion of a back side opposite to a front side of the cartridge body from which the tape-shaped recording medium is drawn out, wherein cartridge discrimination means capable of being admitted into the cartridge discrimination opening are provided at the recording medium loading portion, and wherein an auxiliary memory unit in which information recorded onto the recording medium and/or information relating to the recording medium is stored and said auxiliary memory unit is disposed at a position where visual observation can be made of the auxiliary memory unit through the cartridge discrimination opening formed in the cartridge body.

10. The recording and/or reproducing apparatus as set forth in claim 9 further comprising;

recording medium holding means for holding the recording medium device such that it moves in a horizontal direction, and can be rotated to allow the recording medium device to undergo loading into a cartridge loading portion, wherein the recording medium holding means allows the recording medium device to undergo loading into the cartridge device loading portion while rotating it, and the cartridge discrimination means is admitted into the cartridge discrimination opening.

11. A recording medium device comprising:

a cartridge body within which a recording medium is accommodated;

a contact terminal positioned at an inside of a terminal opening portion opened at an outer circumferential portion of the cartridge body and electrically connected to a connector of an external device;

a shutter member interposed between the terminal opening portion and the contact terminal to open or close the terminal opening portion; and a cartridge discrimination opening indicating a specification of the recording medium device positioned at a corner portion of a bottom surface side of the cartridge body, wherein the cartridge discrimination opening serves as an admission opening into which a shutter drive member of the external device side for operating the shutter member is admitted.

12. The recording medium device as set forth in claim 11, wherein an auxiliary memory unit including, within the cartridge body, a memory element in which specification information of the recording medium and discrimination information at least indicating content of recording information recorded on the recording medium is stored is provided, and where the contact terminal is an input/output terminal of the auxiliary memory unit.

13. The recording medium device as set forth in claim 12, wherein the recording medium is a magnetic tape wound on a pair of tape reels rotatably accommodated within the cartridge body, and the auxiliary memory unit is disposed at one corner portion of the cartridge body.

14. The recording medium device as set forth in claim 13, wherein the cartridge discrimination opening is positioned at an outer circumferential position of the tape reels on which the tape-shaped recording medium is wound in the cartridge body.

15. The recording medium device as set forth in claim 11, wherein the plural recording medium specification discrimination openings indicating the specification of the recording medium are provided at the bottom surface side of the cartridge body and at one corner portion of a back side of the cartridge body, and the cartridge discrimination opening is provided at the other corner portion.

16. The recording medium device as set forth in claim 15, wherein the cartridge discrimination opening is provided in the area where the plural recording medium specification openings are not positioned.

17. A recording and/or reproducing apparatus comprising:

a connector electrically connected to a contact terminal disposed at an inside of a terminal opening portion of a side of a recording medium device; and a shutter drive member adapted to be admitted into a cartridge discrimination opening provided at a side of the recording medium device to allow a shutter member for opening and closing the terminal opening portion to operate, wherein the shutter drive member detects the cartridge discrimination opening of the recording medium device side to discriminate between the recording medium device provided with the contact terminal and a recording medium device which is not provided with the contact terminal.

18. A recording and/or reproducing apparatus comprising:

a connector electrically connected to a contact terminal disposed at an inside of a terminal opening portion of the side of a recording medium device; and a shutter drive member adapted to be admitted into a cartridge discrimination opening provided at a side of a recording medium device to allow a shutter member for opening and closing the terminal opening portion to operate, wherein the shutter drive member detects the cartridge discrimination opening at the side of the recording medium device to discriminate between the recording medium device provided with the contact terminal and a recording medium device which is not provided with the contact terminal.

* * * * *